US012001166B2

(12) United States Patent
Uematsu et al.

(10) Patent No.: US 12,001,166 B2
(45) Date of Patent: Jun. 4, 2024

(54) ELECTROCONDUCTIVE MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Atsushi Uematsu, Shizuoka (JP); Yuichi Kikuchi, Shizuoka (JP); Masatsugu Hongo, Shizuoka (JP); Mototeru Goto, Shizuoka (JP); Masaki Tsunoda, Tokyo (JP); Nao Higuchi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/305,535

(22) Filed: Apr. 24, 2023

(65) Prior Publication Data

US 2023/0280667 A1 Sep. 7, 2023

Related U.S. Application Data

(63) Continuation of application No. PCT/JP2021/040929, filed on Nov. 8, 2021.

(30) Foreign Application Priority Data

Nov. 9, 2020 (JP) ................................ 2020-186694
Oct. 5, 2021 (JP) ................................ 2021-164209

(51) Int. Cl.
*G03G 5/043* (2006.01)
*G03G 15/02* (2006.01)
(Continued)

(52) U.S. Cl.
CPC ....... *G03G 5/0436* (2013.01); *G03G 15/0291* (2013.01); *G03G 15/162* (2013.01);
(Continued)

(58) Field of Classification Search
CPC ............ G03G 15/0233; G03G 15/162; G03G 15/0818; G03G 15/1685; G03G 5/0436; G03G 15/0291; G03G 21/1814
See application file for complete search history.

(56) References Cited

U.S. PATENT DOCUMENTS 8,628,854 B2 1/2014 Yamauchi
8,668,987 B2 3/2014 Yamauchi
(Continued)

FOREIGN PATENT DOCUMENTS

JP 2002-3651 A 1/2002
JP 2013-174808 A 9/2013
(Continued)

OTHER PUBLICATIONS

U.S. Appl. No. 18/174,978, Hideharu Shimozawa, filed Feb. 27, 2023.
(Continued)

*Primary Examiner* — Sandra Brase
(74) *Attorney, Agent, or Firm* — VENABLE LLP

(57) ABSTRACT

An electroconductive member for electrophotography including a support having electro-conductivity and an electroconductive layer on the outer surface of the support, the electroconductive layer including a matrix containing a crosslinked product of a first rubber and first electroconductive particles and domains each containing a crosslinked product of a second rubber and second electroconductive particles, wherein at least part of the first electroconductive particles are present as a primary particle in the crosslinked product of the first rubber, wherein, the first electroconduc-
(Continued)

tive particles of the matrix observed in a specific observation region have d1 of 200 nm or more, the second electroconductive particles in the domains observed therein have d2 of 50 nm or less, and 80 number % or more of the domains satisfy specific conditions.

20 Claims, 6 Drawing Sheets

(51) Int. Cl.
*G03G 15/08* (2006.01)
*G03G 15/16* (2006.01)
*G03G 21/18* (2006.01)

(52) U.S. Cl.
CPC ..... *G03G 21/1814* (2013.01); *G03G 15/0233* (2013.01); *G03G 15/0818* (2013.01); *G03G 15/1685* (2013.01)

(56) References Cited

U.S. PATENT DOCUMENTS

| | | | |
|---|---|---|---|
| 8,771,818 | B2 | 7/2014 | Nishioka |
| 8,852,743 | B2 | 10/2014 | Kikuchi |
| 9,075,333 | B2 | 7/2015 | Uematsu |
| 9,086,643 | B2 | 7/2015 | Kikuchi |
| 9,098,006 | B2 | 8/2015 | Uematsu |
| 9,128,403 | B2 | 9/2015 | Yamauchi |
| 9,146,482 | B2 | 9/2015 | Watanabe |
| 9,274,442 | B2 | 3/2016 | Sato |
| 9,411,307 | B2 | 8/2016 | Matsuda |
| 9,448,502 | B2 | 9/2016 | Taniguchi |
| 9,541,854 | B2 | 1/2017 | Kikuchi |
| 9,547,250 | B2 | 1/2017 | Kikuchi |
| 9,551,949 | B2 | 1/2017 | Yamauchi |
| 9,599,914 | B2 | 3/2017 | Uematsu |
| 9,651,888 | B2 | 5/2017 | Muranaka |
| 9,733,596 | B1 | 8/2017 | Furukawa |
| 9,958,802 | B2 | 5/2018 | Kikuchi |
| 10,018,927 | B2 | 7/2018 | Yamada |
| 10,025,216 | B2 | 7/2018 | Uematsu |
| 10,248,042 | B2 | 4/2019 | Uematsu |
| 10,280,148 | B2 | 5/2019 | Nishioka |
| 10,416,588 | B2 | 9/2019 | Masu |
| 10,678,154 | B2 | 6/2020 | Takashima |
| 10,678,158 | B2 | 6/2020 | Kikuchi |
| 10,845,724 | B2 | 11/2020 | Kikuchi |
| 11,112,719 | B2 | 9/2021 | Makisumi |
| 11,112,748 | B2 | 9/2021 | Yamada |
| 11,137,716 | B2 | 10/2021 | Hiyama |
| 11,169,454 | B2 | 11/2021 | Nishioka |
| 11,175,602 | B2 | 11/2021 | Nishioka |
| 11,340,553 | B2 | 5/2022 | Watariguchi |
| 11,347,156 | B2 | 5/2022 | Kurachi |
| 11,366,402 | B2 | 6/2022 | Ishiduka |
| 11,385,559 | B2 | 7/2022 | Kikuchi |
| 11,392,050 | B2 | 7/2022 | Nishida |
| 11,397,388 | B2 | 7/2022 | Nishioka |
| 11,586,121 | B2 | 2/2023 | Yamada |
| 11,619,890 | B2 | 4/2023 | Uematsu |
| 11,640,122 | B2 | 5/2023 | Kikuchi |
| 11,644,761 | B2 | 5/2023 | Kodama |
| 2002/0022142 | A1 | 2/2002 | Harada |
| 2015/0087489 | A1 | 3/2015 | Sato |
| 2017/0102633 | A1* | 4/2017 | Yoshidome ........ G03G 15/0233 |
| 2020/0310264 | A1* | 10/2020 | Kurachi ............. G03G 21/1814 |
| 2022/0011684 | A1 | 1/2022 | Nishioka |
| 2022/0229379 | A1 | 7/2022 | Kaneko |
| 2022/0244673 | A1 | 8/2022 | Takashima |

FOREIGN PATENT DOCUMENTS

| | | | |
|---|---|---|---|
| JP | 2015-84010 | A | 4/2015 |
| JP | 2017-181604 | A | 10/2017 |
| JP | 2020-166210 | A | 10/2020 |

OTHER PUBLICATIONS

U.S. Appl. No. 18/178,731, Chiharu Nakazono, filed Mar. 6, 2023.
U.S. Appl. No. 18/188,567, Katsuya Kodama, filed Mar. 23, 2023.

* cited by examiner

ELECTROCONDUCTIVE MEMBER, PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2021/40929, filed Nov. 8, 2021, which claims the benefit of Japanese Patent Application No. 2020-186694 filed on Nov. 9, 2020, and Japanese Patent Application No. 2021-164209 filed on Oct. 5, 2021, all of which are hereby incorporated by reference herein in their entirety.

BACKGROUND

Technical Field

The present disclosure relates to an electroconductive member for electrophotography, a process cartridge for electrophotography, and an electrophotographic image forming apparatus.

Description of the Related Art

An electrophotographic image forming apparatus includes a charging member, a transfer member, and a developing member. The charging member is a member for generating discharge between the charging member and an electrophotographic photosensitive member to charge the surface of the electrophotographic photosensitive member.

The developing member is a member for controlling the charge of a developer covering the surface of the developing member by triboelectric charging to give uniform charge quantity distribution to the developer, and then uniformly transfer the developer onto the surface of the electrophotographic photosensitive member in accordance with an applied electric field. The transfer member is a member for transferring the developer from the electrophotographic photosensitive member to a printing medium such as paper or an intermediate transfer member and simultaneously generating discharge to stabilize the developer after the transfer.

Electroconductive members are used as the above-mentioned charging member, transfer member, and developing member. Those electroconductive members are each required to achieve uniform charging for an abutment object, such as the electrophotographic photosensitive member, the intermediate transfer member, or the printing medium. As such electroconductive member, there is known an electroconductive member having a configuration including an electroconductive support and an electroconductive layer arranged on the support. The electroconductive member has a function to transport charge from the electroconductive support to the surface of the electroconductive member and apply the charge to the abutment object by discharge or triboelectric charging.

In Japanese Patent Application Laid-Open No. 2002-3651, there is a disclosure of a charging member for achieving uniform charging. This charging member includes an elastic layer in which polymer particle phases having electro-conductivity are dispersed in a semi-conductive polymer continuous layer having ionic conductivity.

In Japanese Patent Application Laid-Open No. 2020-166210, there is a disclosure of a charging member capable of stably charging a body to be charged even when applied to a high-speed electrophotographic image forming process. This charging member includes an elastic layer having dispersed therein a matrix containing a first rubber and a plurality of domains dispersed in the matrix, the domains each containing a second rubber and an electron conductive material.

In recent years, an electrophotographic image forming process has been increased in speed and increased in lifetime, and there has been provided an electrophotographic image forming apparatus having a configuration including no cleaning member configured to remove a developer (toner) remaining on a photosensitive member (hereinafter sometimes referred to as "cleaner-less configuration") for the purpose of downsizing of the apparatus.

The inventors attempted long-term image formation by applying each of the charging members according to Japanese Patent Application Laid-Open No. 2002-3651 and Japanese Patent Application Laid-Open No. 2020-166210 to the above-mentioned electrophotographic image forming apparatus. As a result, a deposit such as toner remaining on the photosensitive member without being transferred onto paper was remarkably deposited on the surface of the charging member, and over discharge occurred at the site of the deposition, leading to the occurrence of a white speckle-shaped image (hereinafter sometimes referred to as "white spot image") in some cases.

At least one aspect of the present disclosure is directed to provide an electroconductive member that enables high-quality image formation over a long period of time when applied to an electrophotographic image forming process increased in speed and increased in lifetime, and even in a cleaner-less configuration. In addition, at least one aspect of the present disclosure is directed to provide a process cartridge conducive to high-quality electrophotographic image formation. Further, at least one aspect of the present disclosure is directed to provide an electrophotographic image forming apparatus capable of forming a high-quality electrophotographic image.

SUMMARY

According to at least one aspect of the present disclosure, there is provided an electroconductive member comprising: a support having electro-conductivity; and an electroconductive layer arranged on an outer surface of the support, the electroconductive layer including: a matrix containing: a crosslinked product of a first rubber; and first electroconductive particles; and domains each containing: a crosslinked product of a second rubber; and second electroconductive particles, at least a part of the first electroconductive particles being present as a primary particle in the crosslinked product of the first rubber, wherein when defining a length of the electroconductive layer in a longitudinal direction as L and defining a thickness of the electroconductive layer as T, and when 15-micrometer square observation regions are put at arbitrary three positions in a thickness region from an outer surface of the electroconductive layer to a depth of 0.1 to 0.9T on each of cross-sections in a thickness direction of the electroconductive layer at three positions including a center of the electroconductive layer in the longitudinal direction and positions of L/4 from both ends of the electroconductive layer to the center, an average primary particle diameter d1 of the first electroconductive particles present as a primary particle in the matrix observed in each of the nine observation regions in total is 200 nm or more, and an average primary particle diameter d2 of the second electroconductive particles in the domains observed in each of the observation regions is 50 nm or less, and wherein 80 number % or more of the domains observed in each of the observation regions satisfy the following requirement (i) and requirement (ii)

requirement (i)

a ratio of cross-sectional areas of the second electroconductive particles included in a domain with respect to a cross-sectional area of the domain is 20% or more;

requirement (ii)

a circle-equivalent diameter of a domain is 4×d2 or more.

According to at least one aspect of the present disclosure, there is provided a process cartridge removably detachable to a main body of an electrophotographic image forming apparatus, the process cartridge comprising: an electrophotographic photosensitive member; and a charging member arranged to be able to charge the electrophotographic photosensitive member, wherein the charging member is the above mentioned electroconductive member.

According to at least one aspect of the present disclosure, there is provided an electrophotographic image forming apparatus comprising: an electrophotographic photosensitive member; and a charging roller arranged to be able to charge the electrophotographic photosensitive member, wherein the charging roller is the above mentioned electroconductive member.

Further features of the present disclosure will become apparent from the following description of exemplary embodiments with reference to the attached drawings.

DESCRIPTION OF THE EMBODIMENTS

Figure 1:
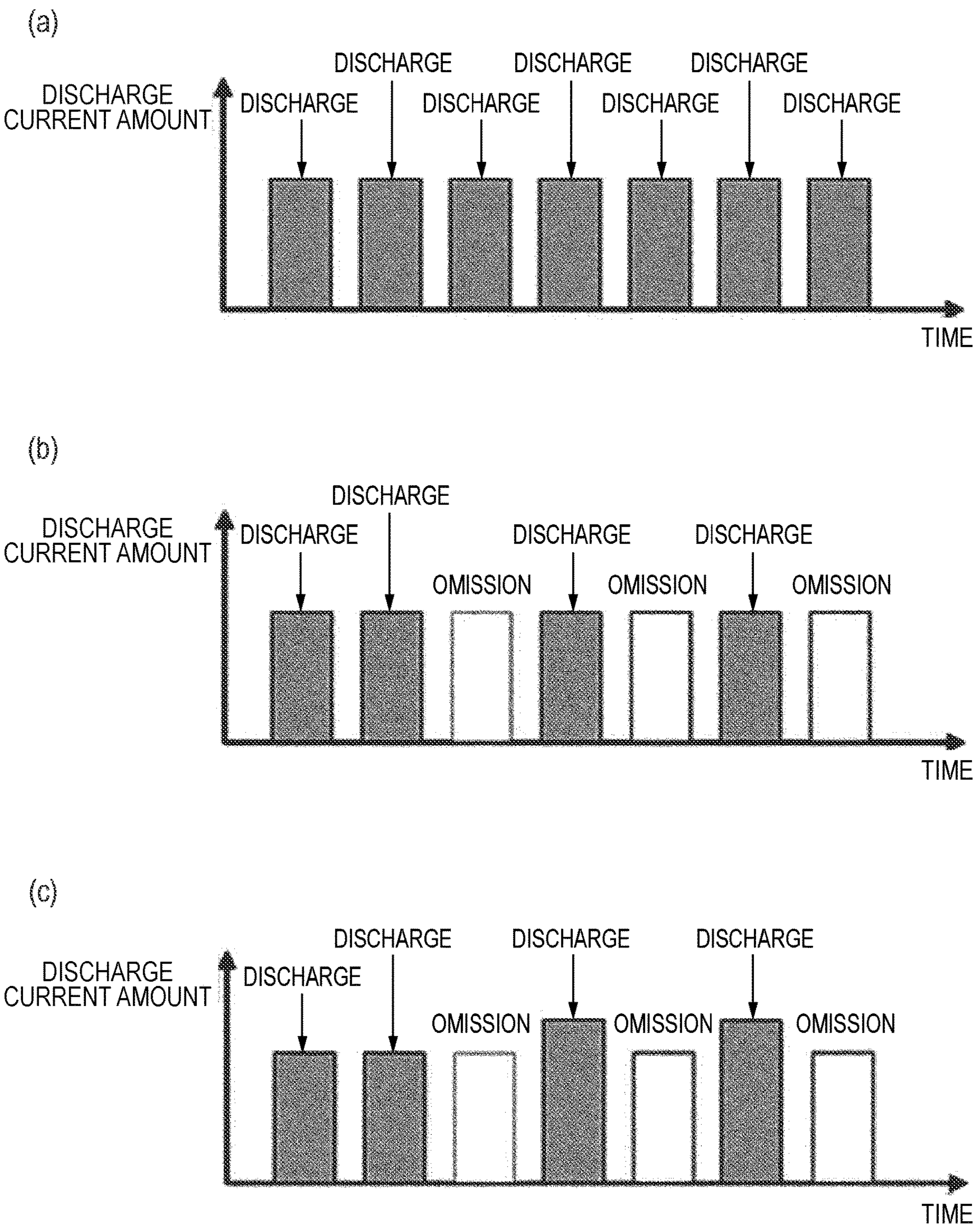
FIG. 1 is a diagram for illustrating temporal changes in discharge current amount in an electrophotographic process.

Now, embodiments of the present disclosure are described in detail with reference to the drawings. However, components described in the embodiments are merely exemplary, and are not intended to limit the scope of the present disclosure to the exemplary embodiments.

An object of the present disclosure is to suppress the occurrence of a white spot image that occurs owing to dirt substances adhering to a charging member in an electrophotographic image forming process increased in speed and increased in lifetime.

The term "dirt substances" as used in the present disclosure refers to substances which are not transferred in their entire amounts at the time of the transfer of toner and an external additive on the surface of a photosensitive drum onto paper or an intermediate transfer member in a transfer process, and part of which remain on the surface of the photosensitive drum to reach and adhere to the charging member.

The toner and the external additive each need to possess a certain charge so as to be able to appropriately transfer to the photosensitive drum in a developing process, and hence have insulating properties in many cases. Consequently, the dirt substances from the toner, the external additive, and the like also have insulating properties. In a developing container, the toner and the external additive are each charged with a polarity that is positively or negatively biased to a large degree. On the other hand, the dirt substances from the toner and the external additive that remain on the photosensitive drum without being transferred onto paper or the intermediate transfer member are subjected to the influence of rubbing or the like before reaching the charging member, thereby being charged to have a certain distribution for positive and negative polarities.

Meanwhile, the charging member (hereinafter sometimes referred to as "charging roller") is configured to cause discharge toward the photosensitive drum. Specifically, a DC voltage is applied to the charging member to generate a potential difference between the charging member and the surface of the photosensitive drum. In this case, with the potential difference between the charging member and the photosensitive drum, it is difficult to prevent a component of a polarity opposite in sign to the polarity of a charging bias from adhering to the charging member side owing to electrostatic attraction. Accordingly, means for suppressing abnormal discharge resulting from the dirt substances even when the dirt substances adhere to the charging roller as described below is desirably used for a charging member that is assumed to be used for a long period of time.

Next, the white spot image, which is caused by abnormal discharge resulting from dirt substances, is described. A discharge phenomenon occurs following Paschen's law between the charging roller and the photosensitive drum, and the surface of the photosensitive drum is charged with negative or positive charge in accordance with an applied voltage. Discharge occurs through ionization of neutral air by an electric field, and hence charge of opposite polarity is also generated at the same time. That is, positive or negative charge of opposite polarity to that of the discharge is caused to migrate toward the charging roller by the electric field. The charging roller is an electroconductive member, and hence, under a state in which the dirt substances do not adhere to the surface of the charging roller, even when the surface of the charging roller is charged up with charge of opposite polarity to that of the discharge, its electro-conductivity allows the charge to escape from the surface to a substrate side. However, when dirt substances (toner and external additive) having insulating properties adhere to the surface of the charging roller, the charge of opposite polarity to that of the discharge does not escape from the surface to the substrate side and is trapped on the surface. At this time, the dirt substances adhering to the surface of the charging roller are charged with opposite polarity to that of the discharge, that is, opposite polarity to that of the voltage applied to the charging roller. Between such dirt substances charged with opposite polarity and regions surrounding a region with the dirt substances adhering thereto, charges of opposite polarities exist at an extremely short distance from each other. Accordingly, an extremely strong electric field is generated, and abnormally excessive discharge occurs owing to the extremely strong electric field in some cases.

In addition, a discharge state in a high-speed process was analyzed in detail with an oscilloscope.

Specifically, one point on the surface of a photosensitive drum was temporally tracked in an electrophotographic process involving causing discharge while rotating the photosensitive drum. FIG. 1 is a diagram for illustrating temporal changes in discharge current amount. In the electrophotographic process, discharge does not occur continuously from the start point of discharge to the end point thereof, but a plurality of discharges repeatedly occur as illustrated in (a) of FIG. 1. As illustrated in (b) of FIG. 1, omission of discharge occurs at timings at which discharge does not easily occur in a high-frequency region. It has been found that, in some cases, as illustrated in (c) of FIG. 1, charge may be supplied excessively in the discharge at the timing following each timing at which the omission of discharge occurs, resulting in the occurrence of discharge having a large discharge amount, that is, over discharge.

In view of the foregoing, the inventors have found that the following conditions (a) and (b) need to be satisfied in order to suppress the occurrence of a white spot image in an electrophotographic image forming process increased in speed and increased in lifetime:

(a) the charge-up of dirt substances is suppressed to avoid the application of an extremely strong electric field to a portion with the dirt substances adhering thereto; and (b) the omission of discharge is suppressed even in a high-frequency region in which discharge does not easily occur, to thereby avoid the supply of excessive charge to the surface immediately after the omission of discharge.

Further, the inventors have made extensive investigations, and as a result, have found that a charging roller satisfying the following requirement (A) and requirement (B) satisfies the above-mentioned conditions (a) and (b), and hence can suppress the occurrence of a white spot image even in a process increased in speed and increased in lifetime.

Requirement (A)

The electroconductive layer includes: a matrix containing: a crosslinked product of a first rubber; and first electroconductive particles; and domains each containing: a crosslinked product of a second rubber; and second electroconductive particles. At least part of the first electroconductive particles are present as a primary particle in the crosslinked product of the first rubber. A length of the electroconductive layer in a longitudinal direction is represented by L and a thickness of the electroconductive layer is represented by T. 15-micrometer square observation regions are put at each of arbitrary three positions in a thickness region from an outer surface of the electroconductive layer to a depth of 0.1T to 0.9T on each of cross-sections in a thickness direction at three positions including a center of the electroconductive layer in the longitudinal direction and positions of L/4 from both ends of the electroconductive layer to the center. The first electroconductive particles present as a primary particle in the matrix observed in each of the nine observation regions in total at this time have an average primary particle diameter d1 of 200 nm or more.

Requirement (B)

The second electroconductive particles in the domains observed in each of the observation regions have an average primary particle diameter d2 of 50 nm or less, and 80 number % or more of the domains observed in each of the observation regions satisfy the following requirement (B1) and requirement (B2).

Requirement (B1)

A ratio of sectional areas of the second electroconductive particles included in a domain with respect to a cross-sectional area of the domain is 20% or more.

Requirement (B2)

A circle-equivalent diameter of a domain is 4×d2 or more.

The above-mentioned requirement (A) indicates that the first electroconductive particles are present in a state of primary particles without forming a structure in the matrix in the matrix-domain structure, and are not made electroconductive. The phrase "made electroconductive" as used herein means that an electron conductive agent forms a structure to allow charge to move via the structure, resulting in a marked reduction in electric resistance. The "state of primary particles" in the present disclosure is defined as a state in which there is no interface in the particles.

The above-mentioned requirement (B) indicates that the second electroconductive particles dispersed in the domains in the matrix-domain structure, in which the domains are dispersed in the matrix and the domains are not connected to each other, have a small average primary particle diameter and achieve high filling. That is, the requirement (B) indicates that an interfacial area between the second rubber and the second electroconductive particles in the domains is extremely large, and that the second electroconductive particles form a structure to express high electro-conductivity.

Figure 2:
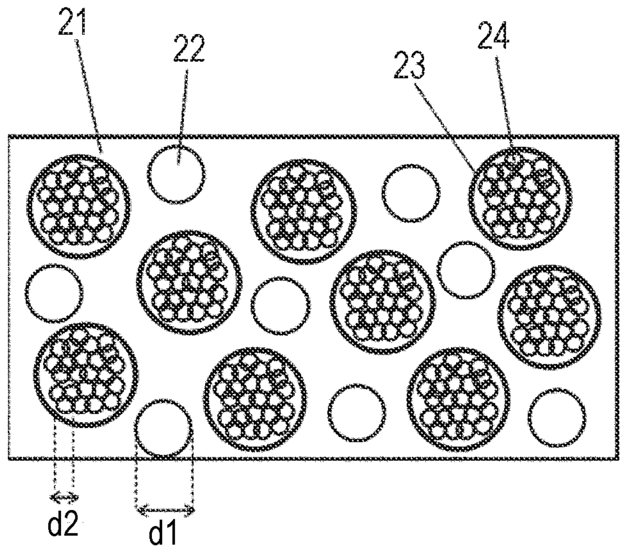
FIG. 2 is a partial sectional view of an electroconductive layer of an electroconductive member according to one embodiment of the present disclosure.

FIG. 2 is a partial sectional view of an electroconductive layer of an electroconductive member having a roller shape (hereinafter sometimes referred to as "electroconductive roller") according to one embodiment of the present disclosure in a direction perpendicular to a longitudinal direction. As illustrated in FIG. 2, the electroconductive layer has a matrix-domain structure having a matrix 21 and domains 23. The matrix 21 contains a crosslinked product of a first rubber and first electroconductive particles 22. The domains 23 each contain a crosslinked product of a second rubber and second electroconductive particles 24.

In the above-mentioned matrix-domain structure, based on the requirement (A), the matrix 21 is not made electroconductive. Based on the requirement (B), the second electroconductive particles 24 have a small primary particle diameter and achieve high filling. Thus, the interfacial area between the second rubber and the second electroconductive particles 24 is extremely large, and hence the domains 23 can accumulate large amounts of charge in the vicinity of their interfaces with the matrix 21 in the domains. When charge is consumed by discharge on the surface of the charging member, the charge accumulated in the domains is quickly supplied to the surface of the charging member because of a shared voltage to be described later, which is applied to each of the first rubber in the matrix, and the domains. By virtue of the characteristic of quickly supplying charge immediately after discharge, the occurrence of such omission of discharge as illustrated in (b) of FIG. 1 can be suppressed. As a result, such phenomenon as illustrated in (c) of FIG. 1, in which an excessive amount of charge is supplied at the next discharge timing to induce over discharge, can be prevented.

When a voltage is applied from the electroconductive support side, the voltage is applied to each of the first rubber and the first electroconductive particles in the matrix, and the domains in such a manner as to be shared thereby (hereinafter sometimes referred to as "shared voltage"). However, the first electroconductive particles in the matrix are conductors, and are present alone, and hence the interfacial area of the first electroconductive particles with the first rubber is small. Accordingly, the shared voltage applied to the first electroconductive particles is markedly small, and most of the voltage applied to the electroconductive layer is applied to the first rubber in the matrix and the domains. As a result, with the first electroconductive particles being present in the state of primary particles in the matrix, the shared voltage applied to each of the first rubber in the matrix and the domains is increased. When the shared voltage applied to the domains is increased, at the time of the supply of the charge accumulated in the domains to the surface, the charge is easily released. Besides, when the shared voltage applied to the first rubber in the matrix is increased, charge supply among the domains or between the domains and the first electroconductive particles is quickly performed. Thus, the charge consumed by discharge can be more quickly supplied by the next discharge timing through use of the charge accumulated in the domains.

In addition, as described above, the first electroconductive particles present in the matrix described in the requirement (A) are themselves conductors, and are present alone, thereby having a small interfacial area with the first rubber. Accordingly, the first electroconductive particles hardly have charge-accumulating capacity unlike the domains, and hence, as compared to the domains, when dirt substances deposited on the surface of the charging member are subjected to discharge, the charge charged up to opposite polarity can be allowed to escape to the electroconductive support side more quickly.

In addition, the charged up charge has opposite polarity to that of the voltage applied from the electroconductive support side, and hence is pulled by an electric field to escape to the electroconductive support side. However, when the first electroconductive particles are present as a primary particle in the matrix, as described above, the shared voltage applied to each of the matrix and the domains is also increased. Accordingly, the charged up charge escaping via the matrix and the domains can also be allowed to escape to the electroconductive support side more quickly.

Thus, the charging member satisfying the requirement (A) and requirement (B) satisfies the above-mentioned conditions (a) and (b), and hence can suppress the occurrence of a white spot image to provide a stable image having high quality in an electrophotographic image forming process increased in speed and increased in lifetime.

Figure 3:
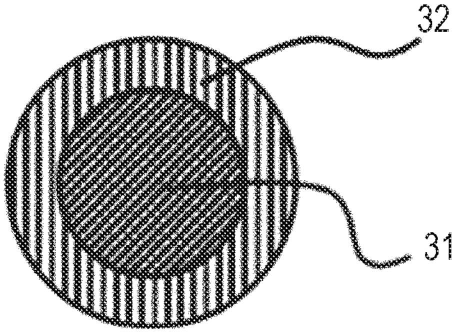
FIG. 3 is a sectional view of an electroconductive roller according to one embodiment of the present disclosure.

The electroconductive member according to the present disclosure is described by taking an electroconductive roller as an example with reference to FIG. 3. FIG. 3 is a sectional view for illustrating the configuration of a section of the electroconductive roller perpendicular to its longitudinal direction, which is its axial direction. The electroconductive roller includes a columnar electroconductive support 31 and an electroconductive layer 32 formed on the outer peripheral surface of the support 31, that is, the outer surface thereof.

<Electroconductive Support>

A material appropriately selected from materials known in the field of an electroconductive member for electrophotography and materials that may each be utilized as an electroconductive member for electrophotography may be used as a material for forming the support 31. An example of the materials is aluminum, stainless steel, a synthetic resin having electro-conductivity, or a metal or an alloy, such as iron or a copper alloy.

Further, such material may be subjected to oxidation treatment or plating treatment with chromium, nickel, or the like. Any one of electroplating and electroless plating may be used as the kind of the plating. Of those, electroless plating is preferred from the viewpoint of dimensional stability. Examples of the kind of the electroless plating to be used herein may include nickel plating, copper plating, gold plating, and plating with other various alloys.

The thickness of the plating is preferably 0.05 μm or more, and in consideration of a balance between working efficiency and a rust-proofing ability, the thickness of the plating is preferably 0.10 μm or more and 30.00 μm or less. The columnar shape of the support 31 may be a solid columnar shape or a hollow columnar shape (cylindrical shape). In addition, the outer diameter of the support preferably falls within the range of from 3 mm or more to 10 mm or less.

<Electroconductive Layer>

The above-mentioned requirement (A) and requirement (B) are satisfied in order to suppress the occurrence of a white spot image even in an electrophotographic process increased in speed and increased in lifetime. Specifically, the supply of excessive charge to the surface of the charging member is prevented by suppressing the charge-up of dirt substances and also suppressing the omission of discharge in a high-frequency region.

The requirement (A) indicates that the first electroconductive particles are present in the state of primary particles without forming a structure in the matrix in the matrix-domain structure, and because of their presence in the state of primary particles, the matrix portion is not made electroconductive.

The requirement (B) indicates that the second electroconductive particles dispersed in the domains have a small average primary particle diameter and achieve high filling, and hence the interfacial area between the second rubber and the second electroconductive particles is extremely large and the domains express high electro-conductivity.

In addition to the requirement (A) and the requirement (B), the following configurations (i) to (v) are more preferably satisfied.

(i) The volume resistivity of the matrix is more than $1.0\times10^{8}$ Ω·cm and $1.0\times10^{17}$ Ω·cm or less.

(ii) The volume resistivity of each of the domains is $1.0\times10^{1}$ Ω·cm or more and $1.0\times10^{4}$ Ω·cm or less.

(iii) A distance between adjacent wall surfaces of the domains falls within the range of from 0.2 μm or more to 2.0 μm or less.

(iv) 90 number % or more of the first electroconductive particles in the matrix are present as a primary particle, and a distance between the first electroconductive particles in the matrix and the most proximate domains is 0.1 μm or more.

(v) When the number of the first electroconductive particles in the matrix is represented by N(A) and the number of the domains is represented by N(B), a ratio N(A)/N(B) is from 0.2 to 3.0.

<Configuration (i)>

In this configuration, as described above, the first electroconductive particles are present as a primary particle in the matrix, and hence the shared voltage applied into the domains is increased to promote charge movement via the domains. Accordingly, when the volume resistivity of the matrix falls within the range of from more than $1.0\times10^{8}$ Ω·cm to $1.0\times10^{17}$ Ω·cm or less, charge bypasses the domains to leak in the matrix. Thus, the establishment of a state as if an electroconductive path communicating in the electroconductive layer 32 was formed can be prevented.

Further, the volume resistivity of the matrix is more preferably more than $1.0\times10^{4}$ Ω·cm and $1.0\times10^{17}$ Ω·cm or less.

<Method of Measuring Volume Resistivity of Matrix>

The volume resistivity of the matrix may be measured with a microprobe for a thin piece prepared from the electroconductive layer 32. As means for preparing the thin piece, there are given, for example, a sharp razor, a microtome, and a focused ion beam (FIB) method.

With regard to the production of the thin piece, it is required that the volume resistivity of only the matrix be measured by eliminating the influence of the domains. For this reason, it is preferred to produce a thin piece having a thickness smaller than an interdomain distance measured in advance using a scanning electron microscope (SEM), a transmission electron microscope (TEM), or the like. Accordingly, the means for preparing the thin piece is preferably means capable of producing an extremely thin sample, such as a microtome.

The measurement of the volume resistivity is performed as described below. First, one surface of the thin piece is grounded, and then the positions of the matrix and the domains in the thin piece are identified. The identification of those positions may be performed by means capable of measuring the distribution of the volume resistivities or hardnesses of the matrix and the domains, such as a scanning probe microscope (SPM) or an atomic force microscope (AFM). Next, a probe is brought into contact with the matrix, and a DC voltage of 50 V is applied for 5 seconds. The arithmetic average value of ground current values during the 5 seconds is measured, and the measured value is divided by the voltage, to thereby calculate an electric resistance value. Then, the electric resistance value is converted into volume resistivity through use of the thickness of the thin piece. In this case, means capable of shape measurement of the thin piece as well, such as the SPM or the AFM, can measure the thickness of the thin piece, thereby being capable of measuring the volume resistivity, and hence is suitable.

In the measurement of the volume resistivity of the matrix in a columnar electroconductive member, one thin piece sample is cut out from each of regions obtained by dividing the electroconductive layer into four parts in its circumferential direction and five parts in its longitudinal direction. The above-mentioned measured value is obtained for each thin piece sample, and then the arithmetic average value of the volume resistivities of the 20 samples in total is calculated.

<Configuration (ii)>

When the volume resistivity of each of the domains is $1.0\times10^{1}$ Ω·cm or more and $1.0\times10^{4}$ Ω·cm or less, a state in which the volume resistivity of each of the domains is sufficiently low can be secured. As a result, while unintended movement of charge in the matrix is suppressed, a charge-transporting path can be limited to a path lying between a plurality of domains, which is more effective.

Further, the volume resistivity of each of the domains is more preferably $1.0\times10^{2}$ Ω·cm or less.

The volume resistivity of each of the domains is adjusted by using an electroconductive agent for the rubber component of the domain to set the electro-conductivity thereof to a predetermined value.

A rubber composition containing a rubber component for the matrix may be used as a rubber material for the domains. In this case, however, a difference in solubility parameter (SP value) between the rubber material for the domains and a rubber material for forming the matrix is preferably set within the following ranges in order to form the matrix-domain structure. That is, the difference in SP value is preferably set to 0.4 $(J/cm^3)^{0.5}$ or more and 5.0 $(J/cm^3)^{0.5}$ or less, and in particular, the difference is more preferably set to 0.4 $(J/cm^3)^{0.5}$ or more and 2.2 $(J/cm^3)^{0.5}$ or less.

The volume resistivity of each of the domains may be adjusted by appropriately selecting the kind and addition amount of an electron conductive agent. The electroconductive agent to be used for controlling the volume resistivity of each of the domains to $1.0\times10^{1}$ Ω·cm or more and $1.0\times10^{4}$ Ω·cm or less is preferably an electron conductive agent that can largely change the volume resistivity from a high resistance to a low resistance in accordance with its dispersion amount.

Examples of the electron conductive agent to be blended into each of the domains include: carbon black and graphite; oxides, such as titanium oxide and tin oxide; metals, such as Cu and Ag; and particles that are made electroconductive through coating of their surfaces with the oxide or the metal. In addition, two or more kinds of those electroconductive agents may be used as a blend thereof in appropriate amounts as required.

Of such electron conductive agents as described above, electroconductive carbon black is preferably used because the carbon black has a large affinity for a rubber and a distance between the molecules of the electron conductive agent is easily controlled. The kind of the carbon black to be blended into each of the domains is not particularly limited, but the use of an electron conductive agent having an average primary particle diameter of 50 nm or less can provide sufficient electro-conductivity. The average primary particle diameter is more preferably 30 nm or less.

The electron conductive agent such as electroconductive carbon black is preferably blended in an amount of 20 parts by mass or more and 150 parts by mass or less into each of the domains with respect to 100 parts by mass of the rubber component in the domain. A particularly preferred blending ratio is 50 parts by mass or more and 100 parts by mass or less. When the electroconductive agent is blended at such ratio, the electroconductive agent is preferably blended in a large amount as compared to a general electroconductive member for electrophotography. Thus, the volume resistivity of each of the domains can be easily controlled within the range of from $1.0\times10^{1}$ Ω·cm or more to $1.0\times10^{4}$ Ω·cm or less.

In addition, a filler, a processing aid, a crosslinking aid, a crosslinking accelerator, an age resistor, a crosslinking accelerator aid, a crosslinking retarder, a softening agent, a dispersant, a colorant, and the like that have been generally used as blending agents for rubbers may be added to the rubber composition for the domains as required to the extent that the effects of the present disclosure are not inhibited.

<Method of Measuring Volume Resistivity of Domain>

The volume resistivity of each of the domains may be measured by the same method as the method of measuring the volume resistivity of the matrix described above except that: a measurement portion is changed to a position corresponding to the domain; and the applied voltage at the time of the measurement of a current value is changed to 1 V.

<Configuration (iii)>

When the distance between the adjacent wall surfaces of the domains (hereinafter sometimes referred to as "interdomain distance") is 0.2 μm or more and 2.0 μm or less, the charge accumulated in the domains can be effectively supplied between the domains without a leakage of the charge from the domains to the matrix.

Further, from the viewpoint of efficiently supplying the charge between the domains, the interdomain distance is preferably 2.0 μm or less. In addition, from the viewpoint of suppressing the leakage of the charge to the matrix, the interdomain distance is more preferably 0.3 μm or more.

<Method of Measuring Interdomain Distance>

A method of measuring the interdomain distance may be performed as described below.

First, a cut piece is produced by the same method as the above-mentioned method in the measurement of the volume resistivity of the matrix. Then, a fracture surface is formed by means, such as a freeze fracture method, a cross polisher method, or a focused ion beam method (FIB). The FIB method is preferred in consideration of the smoothness of the fracture surface and pretreatment for observation. In addition, in order to obtain differences in contrast of the domains from the matrix and the first electroconductive particles, it is preferred that the domains be dyed by dyeing treatment.

The cut piece subjected to the formation of a fracture surface and the pretreatment is observed with a scanning electron microscope (SEM) or a transmission electron microscope (TEM) to determine the presence of the matrix-domain structure.

In particular, from the viewpoint of the accuracy of quantification of an area of the domain, it is preferred to perform the observation with the SEM at a magnification of from 1,000 to 100,000.

The measurement of the interdomain distance is preferably performed by quantifying an image taken of a fracture surface in which the matrix-domain structure appears. A fracture surface image obtained by observation with the SEM is subjected to 8-bit gray scaling through use of image processing software (e.g., "Luzex" (product name, manufactured by Nireco Corporation)) to obtain a monochrome image with 256 levels of gray. Next, the black and white of the image are subjected to inversion processing so that the domains in the fracture surface become white and binarized. Next, a distance between the wall surfaces of a domain size group in the image is calculated. The distance between the wall surfaces at this time is the shortest distance between proximate domains.

In the case of a charging member of a columnar shape, when the length of the electroconductive layer in the longitudinal direction is represented by L and the thickness of the electroconductive layer is represented by T, sections of the electroconductive layer in the thickness direction at three positions including the center of the electroconductive layer in the longitudinal direction and positions of L/4 from both ends of the electroconductive layer to the center are acquired. For each of the resultant sections, a 50-micrometer square observation region is set at each of arbitrary three positions in a thickness region from the outer surface of the electroconductive layer to a depth of from 0.1T to 0.9T toward the support. The respective interdomain distances observed in each of the nine observation regions in total only need to be measured. The cut piece is cut out in the direction in which a section including a normal starting from the central axis of the support can be observed because a surface including a region from the support to the outer surface of the electroconductive layer, the region corresponding to a charge-moving direction, needs to be observed.

<Configuration (iv)>

90 number % or more of the first electroconductive particles in the matrix are present as a primary particle, and a distance between the first electroconductive particles in the matrix and the most proximate domains is 0.1 μm or more. This indicates that the first electroconductive particles in the matrix do not form a structure, and that the first electroconductive particles in the matrix and the domains are not connected, and for example, the first electroconductive particles and the domains are not connected to cause excessive charge movement. Thus, charge can be accumulated in the domains.

That the first electroconductive particles do not form a structure in the matrix, and that the first electroconductive particles and the domains are not connected to cause marked charge movement may also be judged by measuring impedance characteristics described below.

In the measurement of an impedance at a frequency of $1.0\times10^{-1}$ Hz where a DC voltage is superimposed on an AC voltage, an impedance at a DC voltage of 0 V is defined as an impedance A and an impedance at a DC voltage of 10 V is defined as an impedance B. The above-mentioned judgment is based on whether a ratio "impedance A/impedance B" is 60 or less. In the case where the first electroconductive particles form a structure in the matrix, or in the case where the first electroconductive particles and the domains are connected to cause marked charge movement, it becomes difficult to accumulate charge in the domains when the DC voltage is increased. Accordingly, the impedance B in the case of applying a DC voltage of 10 V is markedly reduced as compared to the impedance A in the case of applying no DC voltage. As a result, the ratio "impedance A/impedance B" is increased. The inventors have judged that, when impedance A/impedance B≤60, sufficient charge can be accumulated in the domains. Here, the impedance A is preferably from $1.0\times10_3\Omega$ to $1.0\times10^8\Omega$.

<Impedance Measurement Method>

When an impedance is measured, in order to eliminate the influence of contact resistance between the electroconductive member and a measuring electrode, a low-resistance thin film is deposited on the surface of the electroconductive member, and the impedance is measured with two terminals using the thin film as the electrode and using the electroconductive support as a ground electrode.

As a method of forming the thin film, there may be given methods of forming metal films, such as metal vapor deposition, sputtering, application of a metal paste, and application of a metal tape. Of those, a method of forming a thin film of a metal, such as platinum or palladium, as an electrode by vapor deposition is preferred from the viewpoint of reducing the contact resistance with the electroconductive member.

When a metal thin film is formed on the surface of the electroconductive member, it is preferred to provide a vacuum vapor deposition device with a mechanism capable of gripping the charging member in consideration of the simplicity thereof and the uniformity of the thin film. In addition, for an electroconductive member having a columnar section, it is preferred to use a vacuum vapor deposition device further provided with a rotation mechanism.

For an electroconductive member having a section formed of a curved surface such as a circular shape, for example, a columnar electroconductive member, it is difficult to connect the metal thin film serving as the measuring electrode described above and an impedance-measuring device, and hence such a method as described below is preferably used. Specifically, it is appropriate that the measurement be performed by forming a metal thin film electrode having a width of from about 10 mm to about 20 mm in the longitudinal direction of the electroconductive member, then winding a metal sheet therearound without any gap, and connecting the metal sheet to a measuring electrode coming out of the measuring device. Thus, an electric signal from the electroconductive layer of the electroconductive member can be suitably acquired with the measuring device, and the impedance measurement can be performed. The metal sheet only needs to be a metal sheet having an electric resistance value comparable to that of the metal portion of a connection cable of the measuring device at the time of the measurement of the impedance, and for example, aluminum foil or a metal tape may be used.

The impedance-measuring device only needs to be a device capable of measuring an impedance in a frequency region up to $1.0\times10^{7}$ Hz, such as an impedance analyzer, a network analyzer, or a spectrum analyzer. The measurement is preferably performed with the impedance analyzer out of those devices in view of the electric resistance region of the electroconductive member.

Conditions for the measurement of the impedance are described. The impedance in the frequency region of $1.0\times10^{-1}$ Hz is measured with the impedance-measuring device. The measurement is performed under an environment having a temperature of 23° C. and a humidity of 50% RH. To reduce measurement variation, it is preferred that five or more measurement points be arranged for each order of magnitude of the frequency. In addition, the amplitude of the AC voltage is 1 V.

With regard to a measurement voltage, first, measurement is performed with only an AC voltage without the application of any DC voltage, and then measurement is performed while a DC voltage is applied to be superimposed on the above-mentioned AC voltage. The DC voltage to be superimposed is preferably 10 V. This is because the shared voltage applied to a charging roller in a general electrophotographic image forming apparatus is about 10 V.

<Configuration (v)>

In the present disclosure, the domains highly filled with the second electroconductive particles accumulate charge on the interface side with the matrix in the domains, but as described above, the first electroconductive particles that are present in the state of primary particles in the matrix hardly accumulate charge. Accordingly, the shared voltage applied to each of the first rubber in the matrix and the domains is increased, and hence, after charge on the surface of the charging member has been consumed by discharge, the charge accumulated in the domains can be rapidly supplied. Consequently, excessive charge movement can be prevented through the prevention of the omission of discharge in a high-frequency region, and besides, the charge with which dirt substances are charged up can be allowed to escape to the electroconductive substrate side quickly. Thus, the occurrence of a white spot image can be prevented.

When the number of the first electroconductive particles in the matrix is represented by N(A) and the number of the domains is represented by N(B), a case in which a ratio N(A)/N(B) is from 0.2 to 3.0 is preferred. When the ratio N(A)/N(B) is less than 0.2, the number of the first electroconductive particles is not sufficient, and hence the above-mentioned effect is not sufficiently obtained. In addition, when the ratio N(A)/N(B) is more than 3.0, owing to the large number of the first electroconductive particles, the ratio at which the first electroconductive particles are present as a primary particle described in the configuration (iv) is reduced, and a region in which the domains and the first electroconductive particles are connected is liable to occur. The ratio N(A)/N(B) is more preferably from 0.35 to 0.70.

In the present disclosure, it is more desired that the following impedance characteristics be satisfied.

First Requirement

The slope of an impedance at a frequency of from $1.0\times10^{5}$ Hz to $1.0\times10^{6}$ Hz (hereinafter sometimes referred to as "slope of the high-frequency impedance") is −0.8 or more.

Second Requirement

An impedance at a frequency of from $1.0\times10^{2}$ Hz to $1.0\times10^{1}$ Hz (hereinafter sometimes referred to as "low-frequency impedance") is $1.0\times10^{3}\Omega$ or more and $1.0\times10^{8}\Omega$ or less.

The equivalent circuit of the electroconductive member is represented by the parallel circuit of an electric resistance R and an electrostatic capacitance C, and the absolute value Z of the impedance may be represented by the following equation (1).

$$|Z| = \sqrt{\frac{1}{R^{-2} + (2\pi f)^2 C^2}} \tag{1}$$

The first requirement indicates that the stagnation of charge in the electroconductive member at high frequencies hardly occurs. A case in which the movement of the charge cannot follow a high-frequency voltage and stagnates may be assumed to be a state in which such a so-called insulating electrostatic capacitance that the electric resistance value R is largely increased is measured. A state in which the charge stagnates may be conceived to be a state in which the R in the equation (1) is approximated to infinity, and the following approximation can be made: in the following expression (2) obtained by extracting the elements of the denominator of the equation (1), the $R^{-2}$ has an extremely small value as compared to the $(2\pi f)^2C^2$. Accordingly, the equation (1) can be deformed into an equation having applied thereto an approximation like the following equation (3) from which the $R^{-2}$ is removed. Finally, when equation deformation in which the logarithm of both the sides of the equation (3) is taken is performed, the following equation (4) is obtained and the slope of log f becomes−1.

$$R^{-2} + (2\pi f)^2 C^2 \tag{2}$$

$$|Z| = \sqrt{\frac{1}{(2\pi f)^2 C^2}} \tag{3}$$

$$\log |Z| = -\log f - \log(2\pi C) \tag{4}$$

In other words, a case in which the slope of the high-frequency impedance is −1 means that the movement of the charge cannot follow a high-frequency voltage. In this case, the supply of the charge for discharge cannot follow the frequency of the discharge, resulting in a timing at which discharge cannot be performed. The occurrence of a timing at which discharge cannot be performed means that the accumulated charge may move at one time at the discharge timing immediately thereafter. When a large amount of charge moves at one time, excessive discharge may be induced.

Meanwhile, in such an electroconductive member that the slope of the high-frequency impedance is −0.8 or more, the supply of the charge hardly stagnates at high frequencies. As a result, the supply of the charge can be performed with respect to discharge at frequencies ranging from the low-frequency region in which the impedance has a constant value to the high-frequency region, in particular, discharge at high frequencies where the stagnation of charge is liable to occur. The supply of the charge can be sufficiently achieved, and hence the omission of discharge does not occur. The charge is suppressed from moving at one time, and hence excessive discharge can be suppressed.

The range of the high-frequency region is conceived to correspond to a region in which the omission of discharge is liable to occur because the range is the highest frequency region in which discharge occurs out of the frequencies at which discharge occurs from the electroconductive member.

In other words, the range is a region in which the omission of discharge is liable to occur and in which excessive discharge is liable to be induced at the discharge timing immediately thereafter. When the slope shows a value of more than −1 within the above-mentioned range in such frequency region, the occurrence of excessive discharge resulting from the omission of discharge can be suppressed.

With regard to the measurement frequency region of the high-frequency impedance, the inventors conceive that the frequency of general discharge in the case of combining a charging roller for electrophotography serving as a charging member and a photosensitive drum is predicted to fall within such a range as described below.

A discharge region in the movement direction of the surface of the charging roller, which is arranged to face the outer surface of the photosensitive drum, and performs rotational movement in synchronization with the photosensitive drum, is set to from 0.5 mm to 1 mm. When the process speed of an electrophotographic image forming apparatus is assumed to be from 100 mm/sec to 500 mm/sec at maximum, a period of time in which the surface of the photosensitive drum passes through the discharge region is from $1.0\times10^{-3}$ sec to $1.0\times10^{-2}$ sec or more. In addition, when discharge is observed in detail, the length of the discharge region of a single discharge is from 0.01 mm to 0.1 mm, and hence it is presumed that at least 5 to 100 discharges occur during the passage of the same point on the surface of the charging roller through the discharge region. Accordingly, it is presumed that the frequency of discharge caused by the charging roller falls within the range of from several Hz to $1.0\times10^{6}$ Hz. As the process speed becomes higher, the number of discharges needs to be increased by making the frequency of the discharge higher. Accordingly, it has been conceived that the control of discharge and a conduction mechanism particularly in the high-frequency region of, for example, from $1.0\times10^{5}$ Hz to $1.0\times10^{6}$ Hz out of the above-mentioned range is important.

The low-frequency impedance of the second requirement represents such a characteristic that charge hardly stagnates. When the frequency is approximated to 0, the absolute value of the impedance can be approximated to the electric resistance value R. Accordingly, it is found that the electric resistance value R represents an ability at the time of the movement of the charge in a single direction.

Accordingly, it can be assumed that measurement simultaneous with the application of a low-frequency voltage simulates the movement amount of the charge in a state in which the movement of the charge can follow the vibration of the voltage.

The movement amount of the charge at low frequencies is an indicator of the ease with which the charge moves between the charging member and the measuring electrode. Further, the amount may be used as an indicator of the amount of the charge moved from the surface of the charging member to the photosensitive drum by discharge.

The amplitude of the AC voltage to be used for the measurement of the impedance is 1 V. The vibration voltage for the measurement is significantly low in view of the fact that a voltage to be actually applied to the charging member in an electrophotographic image forming apparatus is from several hundreds of volts to several thousands of volts. Accordingly, it is conceived that the measurement of the impedance according to the first requirement and the second requirement enables the evaluation of the ease with which discharge occurs from the surface of the charging member at a higher level.

When the low-frequency impedance is less than $1.0\times10^{3}\Omega$, the amount of one discharge may become so large as to induce over discharge at a time when dirt substances are charged up.

Meanwhile, when the low-frequency impedance is more than $1.0\times10^{8}\Omega$, discharge performance is lowered, and in the case where dirt substances are present on the surface of the charging member, sufficient charge cannot be applied to the photosensitive member, with the result that a difference in discharge amount is generated in accordance with a difference in amount of the dirt substances. Accordingly, unevenness in deposition amount of the dirt substances occurs as unevenness in potential of the photosensitive member in some cases.

Figure 4:
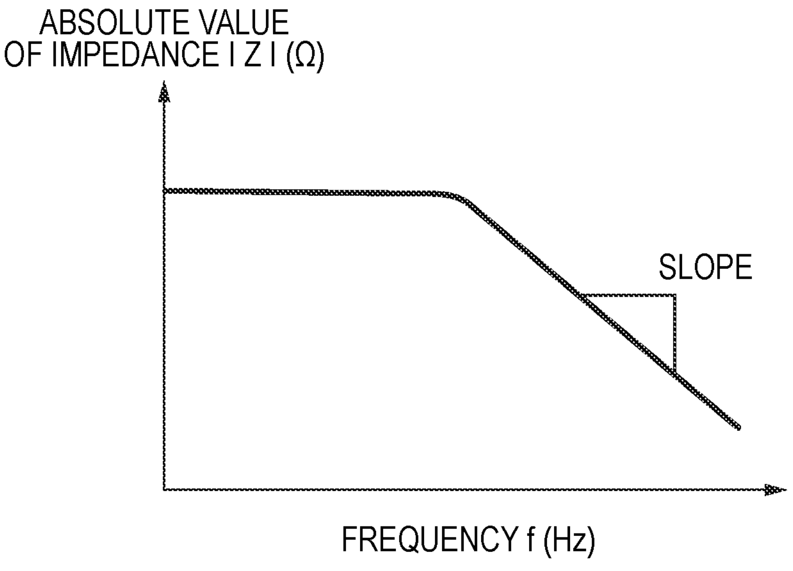
FIG. 4 is a graph showing changes in absolute value of impedance versus frequency.

FIG. 4 shows changes in absolute value Z (Ω) of impedance versus frequency "f" (Hz). As shown in FIG. 4, in the charging member, the absolute value of the impedance has a constant value in the low-frequency region. The impedance at from $1.0\times10^{-2}$ Hz to $1.0\times10^{1}$ Hz may be substituted by, for example, the value of the impedance at a frequency of 0.1 Hz.

The electroconductive member according to the present disclosure may be formed through, for example, a method including the following steps (a) to (d)

- step (a): a step of preparing a rubber mixture for forming domains (hereinafter also referred to as "CMB") containing the second electroconductive particles and the second rubber;
- step (b): a step of preparing a rubber mixture for forming a matrix (hereinafter also referred to as "MRC") containing the first electroconductive particles and the first rubber;
- step (c): a step of kneading the CMB and the MRC to prepare a rubber mixture having a matrix-domain structure; and
- step (d): a step of forming the rubber composition prepared in the step (c) on the electroconductive support directly or through intermediation of any other layer, followed by the curing of the layer of the rubber composition to form the electroconductive layer according to the present disclosure.

As described above, the MRC contains the first rubber and the first electroconductive particles.

<First Rubber>

The blending ratio of the first rubber is largest in a rubber mixture for forming the electroconductive layer, and the crosslinked product of the first rubber dominates the mechanical strength of the electroconductive layer. Accordingly, a rubber that expresses strength required for an electroconductive member for electrophotography in the electroconductive layer after its crosslinking is used as the first rubber.

Preferred examples of the first rubber include a natural rubber (NR), an isoprene rubber (IR), a butadiene rubber (BR), a styrene-butadiene rubber (SBR), a butyl rubber (IIR), an ethylene-propylene rubber (EPM), an ethylene-propylene-diene terpolymer rubber (EPDM), a chloroprene rubber (CR), an acrylonitrile-butadiene rubber (NBR), a hydrogenated product of NBR (H-NBR), an epichlorohydrin homopolymer, an epichlorohydrin-ethylene oxide copolymer, an epichlorohydrin-ethylene oxide-allyl glycidyl ether terpolymer, and a silicone rubber.

In addition, a filler, a processing aid, a crosslinking agent, a crosslinking accelerator, an age resistor, or the like may be added as required.

<First Electroconductive Particles>

Examples of the first electroconductive particles include carbon black and an electroconductive metal oxide such as titanium oxide, but as described above, in order to accumulate sufficient charge in the domains, the electroconductive particles need to be present in the state of primary particles without forming a structure. For example, in the case of the carbon black, it is preferred to select carbon black having a large primary particle diameter and having a small DBP absorption.

It is preferred that carbon black satisfying the above-mentioned characteristics have a primary particle diameter of 200 nm or more, and have a DBP absorption of less than 40 $cm^3$/100 g. A specific example thereof is MT carbon.

The DBP absorption is the volume of dibutyl phthalate (DBP) that can be adsorbed by 100 g of the carbon black, and is measured in conformity with JIS K 6217. Carbon black has a tufted high-order structure in which primary particles are aggregated (hereinafter referred to as "structure"), and the degree of the structure is quantified by the DBP absorption ($cm^3$/100 g).

The electroconductive metal oxide preferably has a primary particle diameter of 200 nm or more.

<Method of Measuring Primary Particle Diameter of First Electroconductive Particles>

The primary particle diameter of the first electroconductive particles may be observed by the method described in the method of recognizing the first electroconductive particles described above. For the calculation of the particle diameter, adjustment is performed through binarization processing or the like so that the first electroconductive particles become white and a matrix polymer portion becomes black, and the particle diameter is calculated using image processing software. Sampling positions of cut pieces are three positions in total including the center of the electroconductive layer in the longitudinal direction and two positions of L/4 from both ends of the electroconductive layer to the center when the length of the electroconductive layer of the electroconductive member in the longitudinal direction is represented by L. The cut piece is cut out from each of those three positions. Measurement positions are nine positions in total including arbitrary three positions of the matrix portion in a thickness region from the outer surface of each of the cut pieces to a depth of 0.1T to 0.9T when the thickness of the electroconductive layer is represented by T. For those nine positions, the particle diameters of all the first electroconductive particles are calculated, and the arithmetic average value thereof is adopted as the average particle diameter of the first electroconductive particles.

As described above, the domains each contain the second rubber and the second electroconductive particles.

<Second Rubber>

A specific example of the second rubber is at least one selected from the group consisting of: a natural rubber (NR); an isoprene rubber (IR); a butadiene rubber (BR); an acrylonitrile-butadiene rubber (NBR); a styrene-butadiene rubber (SBR); a butyl rubber (IIR); an ethylene-propylene rubber (EPM); an ethylene-propylene-diene rubber (EPDM); a chloroprene rubber (CR); a nitrile rubber (NBR); a hydrogenated nitrile rubber (H-NBR); a silicone rubber; and a urethane rubber (U).

<Second Electroconductive Particles>

Examples of the second electroconductive particles include: carbon materials, such as electroconductive carbon black and graphite; and metal oxides, such as titanium oxide and tin oxide. Two or more kinds of those electroconductive particles may be appropriately blended. In addition, the second electroconductive particles to be blended into each of the domains are preferably added in such an amount that the ratio of the sectional areas of the electroconductive particles to the sectional area of the domain is at least 20% or more, preferably 25% or more. The upper limit of the ratio of the sectional areas of the electroconductive particles to the sectional area of the domain is not particularly limited, but is preferably 30% or less.

Electroconductive carbon black is suitably used as the second electroconductive particles to be blended into each of the domains because the carbon black has high efficiency of electro-conductivity impartment and a large affinity for a rubber and a distance between the electroconductive particles is easily controlled.

The kind of the electroconductive carbon black to be blended into each of the domains is not particularly limited. Specific examples thereof include gas furnace black, oil furnace black, thermal black, lamp black, acetylene black, and ketjen black. However, from the standpoint of the charge supply described above, it is preferred that the carbon black have a primary particle diameter of 50 nm or less and a DBP oil absorption of 40 $cm^3$/100 g or more and 170 $cm^3$/100 g or less.

It is preferred that the electroconductive metal oxide, such as titanium oxide or tin oxide, also have a primary particle diameter of 50 nm or less.

<Process Cartridge>

Figure 5:
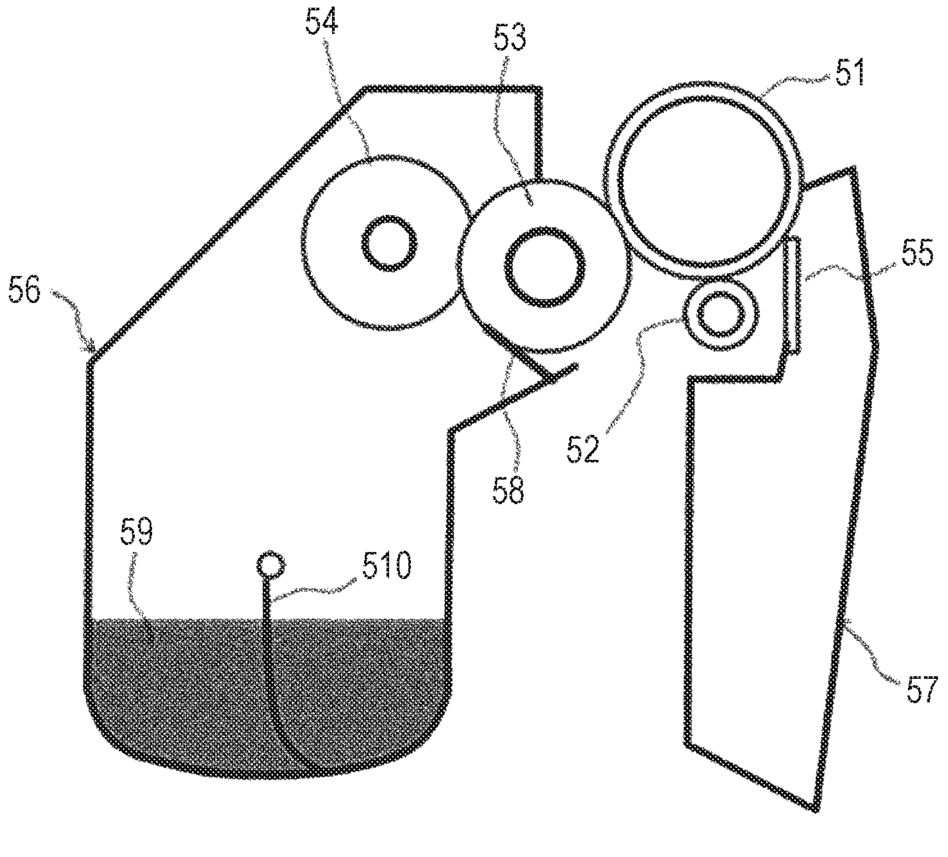
FIG. 5 is a sectional view of a process cartridge including the electroconductive member according to the present disclosure.

FIG. 5 is a schematic sectional view of a process cartridge for electrophotography including the electroconductive member according to the present disclosure as a charging roller. The process cartridge is formed by integrating a developing device and a charging device, and is removably mounted onto a main body of an electrophotographic image forming apparatus. The developing device is obtained by integrating at least a developing roller 53 and a toner container 56, and may include a toner-supplying roller 54, a toner 59, a developing blade 58, and a stirring blade 510 as required. The charging device is obtained by integrating at least a photosensitive drum 51 and a charging roller 52, and may include a cleaning blade 55 and a waste toner container 57. A cleaner-less configuration is a state in which the cleaning blade 55 and the waste toner container 57 are absent. A voltage is applied to each of the charging roller 52, the developing roller 53, the toner-supplying roller 54, and the developing blade 58. The charging roller 52, which is a charging member, is arranged to be able to charge the photosensitive drum 51, which is an electrophotographic photosensitive member.

<Electrophotographic Image Forming Apparatus>

Figure 6:
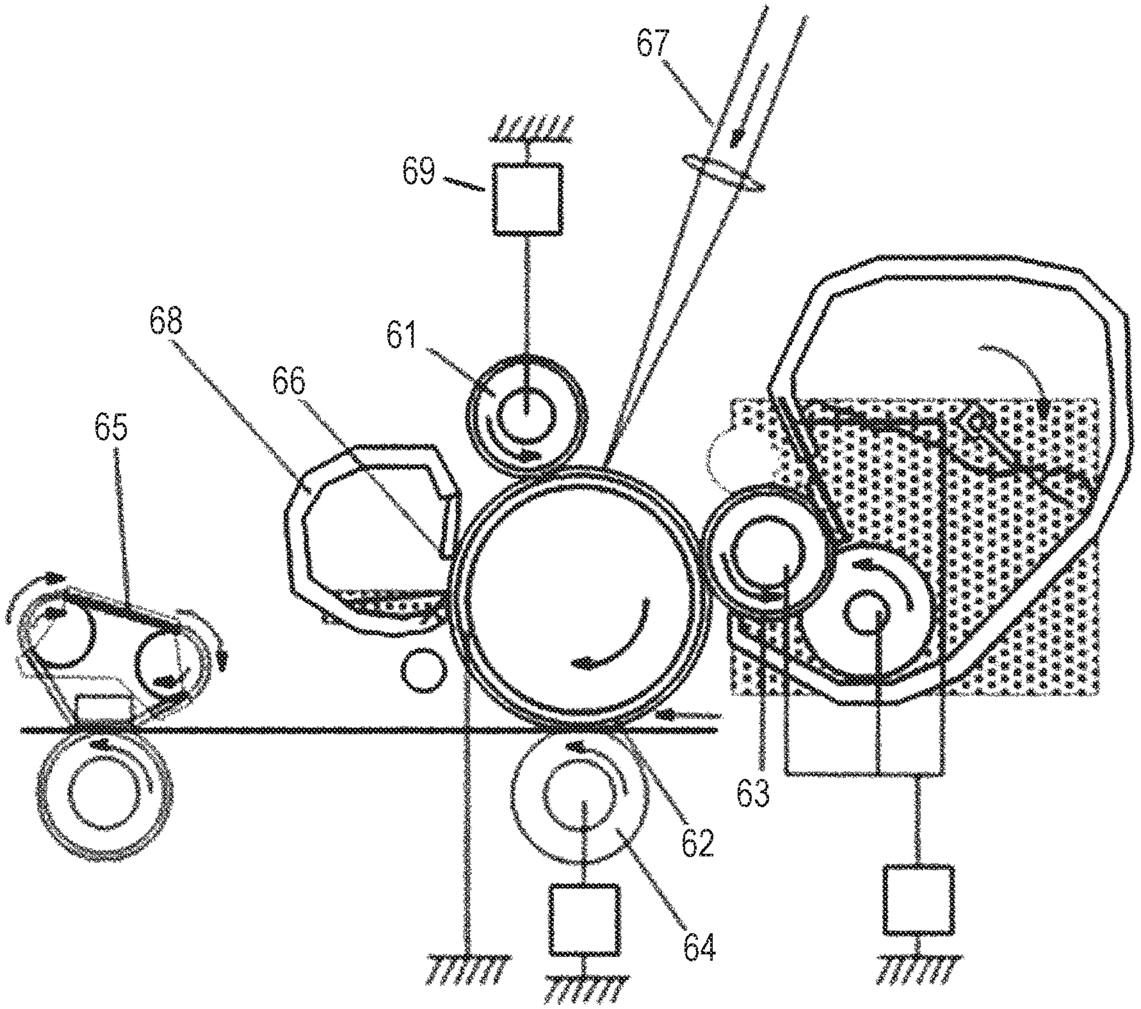
FIG. 6 is a schematic configuration view of an electrophotographic image forming apparatus including the electroconductive member according to the present disclosure.

FIG. 6 is a schematic configuration view of an electrophotographic image forming apparatus using the electroconductive member according to the present disclosure as a charging roller. This electrophotographic image forming apparatus includes an electrophotographic photosensitive member, a charging device, a latent image forming device, a developing device, a transfer device, a cleaning device, a fixing device, and the like. The charging device charges the electrophotographic photosensitive member. The latent image forming device exposes the electrophotographic photosensitive member to light to form an electrostatic latent image. The developing device develops the electrostatic latent image as a toner image. The transfer device transfers the toner image onto a transfer material. The cleaning device recovers transfer residual toner on the electrophotographic photosensitive member. The fixing device fixes the toner image onto the transfer material. In the case of the cleaner-less configuration, the configuration is free of any cleaning device configured to recover the transfer residue. The roller for electrophotography according to the present disclosure may be used as a roller for electrophotography included in the charging device of the electrophotographic image forming apparatus. The roller for electrophotography, which is a charging member, is arranged to be able to charge the electrophotographic photosensitive member.

An electrophotographic photosensitive member 62 is of a rotary drum type having a photosensitive layer on an electroconductive substrate. The electrophotographic photosensitive member 62 is driven to rotate in the arrow direction at a predetermined peripheral speed (process speed). The charging device includes a contact-type charging roller 61 arranged to be brought into contact with the electrophotographic photosensitive member 62 by being brought into abutment thereagainst with a predetermined pressing force. The charging roller 61 is configured to perform such driven rotation as to rotate following the rotation of the electrophotographic photosensitive member 62. When a predetermined DC voltage is applied from a charging power source 69 to the charging roller 61, the charging roller 61 charges the electrophotographic photosensitive member 62 to a predetermined potential. For example, an exposing device such as a laser beam scanner is used as the latent image forming device (not shown) configured to form an electrostatic latent image on the electrophotographic photosensitive member 62. The electrophotographic photosensitive member 62 that has been uniformly charged is irradiated with exposure light 67 corresponding to image information to form an electrostatic latent image.

The developing device includes a developing sleeve or developing roller 63 arranged to be brought into proximity to or contact with the electrophotographic photosensitive member 62. The developing device develops the electrostatic latent image to form a toner image by reversal development through use of toner subjected to electrostatic treatment so as to have the same polarity as the charging polarity of the electrophotographic photosensitive member 62. The transfer device includes a contact-type transfer roller 64. The toner image is transferred from the electrophotographic photosensitive member 62 onto a transfer material such as plain paper. The transfer material is conveyed by a sheet-feeding system including a conveying member.

The cleaning device includes a blade-type cleaning member 66 and a recovery container 68.

The cleaning device mechanically scrapes off and recovers transfer residual toner remaining on the electrophotographic photosensitive member 62 after the developed toner image has been transferred onto the transfer material. When a cleaning-at-development system involving recovering the transfer residual toner with the developing device is adopted, the cleaning device can be omitted. The toner image transferred onto the transfer material passes through a space between a fixing belt 65 heated by a heating device (not shown) and a roller arranged to face the fixing belt 65, and is thus fixed onto the transfer material.

EXAMPLES

Specific Examples and Comparative Examples according to the present disclosure are described below. Electroconductive members in Examples and Comparative Examples of the present disclosure were produced using materials shown in Table 1.

TABLE 1

| Kind of material | Material abbreviation | Material name | Product name | Manufacturer name |
|---|---|---|---|---|
| Rubber material | N230SV | Acrylonitrile-butadiene rubber (NBR) | JSR NBR N230SV | JSR |
| | N215SL | Acrylonitrile-butadiene rubber (NBR) | JSR NBR N215SL | JSR |
| | DN401LL | Acrylonitrile-butadiene rubber (NBR) | Nipol DN401LL | Zeon |
| | A303 | Styrene-butadiene rubber (SBR) | ASAPRENE 303 | Asahi Kasei |
| | T2003 | Styrene-butadiene rubber (SBR) | TUFDENE 2003 | Asahi Kasei |
| | Esplene 505A | Ethylene-propylene-diene rubber (EPDM) | Esplene 505A | Sumitomo Chemical |
| | Esplene 301A | Ethylene-propylene-diene rubber (EPDM) | Esplene 301A | Sumitomo Chemical |
| | BR150B | Polybutadiene rubber (BR) | UBEPOL BR150B | Ube Industries |
| | IR2200L | Isoprene rubber (IR) | Nipol IR2200L | Zeon |
| | CG103 | Epichlorohydrin rubber | EPICHLOMER CG103 | Osaka Soda |
| Electroconductive agent | N990 | MT carbon | Thermax Floform N990 | Cancarb |
| | #5500 | Electroconductive carbon black | TOKABLACK #5500 | Tokai Carbon |
| | #7360SB | Electroconductive carbon black | TOKABLACK #7360SB | Tokai Carbon |
| | #4500 | Electroconductive carbon black | TOKABLACK #4500 | Tokai Carbon |
| | A-100 | Titanium oxide | A-100 | Ishihara Sangyo |
| | Ketjen | Electroconductive carbon black | Carbon ECP | Lion Specialty Chemicals |
| | LV | Ion electroconductive agent | LV70 | ADEKA |

TABLE 1-continued

| Kind of material | Material abbreviation | Material name | Product name | Manufacturer name |
|---|---|---|---|---|
| Vulcanizing agent | PMC | Sulfur | SULFAX PMC | Tsurumi Chemical Industry |
| Vulcanization | TBzTD | Tetrabenzylthiuram disulfide | SANCELER TBZTD | Sanshin Chemical Industry |
| accelerator | EP-60 | Vulcanization accelerator mixture | NOCCELER EP-60 | Ouchi Shinko Chemical Industrial |
| | TET | Tetraethylthiuram disulfide | SANCELER TET-G | Sanshin Chemical Industry |
| Filler | #30 | Calcium carbonate | NANOX #30 | Maruo Calcium |
| | XM-221U | Polyethylene particles | MIPELON XM-221U | Mitsui Chemicals |

The term "phr" in the tables shown below is an abbreviation of "per hundred rubber," which represents a blending amount with respect to 100 parts by mass of a rubber. In the following Examples 1 to 30 and Comparative Examples 1 to 4, charging rollers of Examples 1 to 30 are referred to as "charging roller 1" to "charging roller 30", respectively, and charging rollers of Comparative Examples 1 to 4 are referred to as "charging roller 31" to "charging roller 34", respectively.

Example 1

1. Preparation of Unvulcanized Rubber Composition for Forming Electroconductive Layer to be Used for Formation of Electroconductive Layers According to Examples and Comparative Examples

1-1. Preparation of Carbon Masterbatch for Forming Domains (CMB)

Respective materials of kinds and blending amounts shown in Table 2 were mixed with a 6-liter pressure kneader (product name: TD6-15MDX, manufactured by Toshin Co., Ltd.) to provide a CMB for forming domains. The mixing conditions were set to a filling ratio of 70 vol %, a blade rotation speed of 30 rpm, and 16 minutes.

TABLE 2

| | Raw material name | Blending amount (parts by mass) |
|---|---|---|
| Second rubber | NBR (Product name: JSR N230SV, manufactured by JSR Corporation) | 100 |
| Electroconductive particles 2 | Carbon black (Product name: TOKABLACK #7360SB, manufactured by Tokai Carbon Co., Ltd.) | 60 |
| Vulcanization accelerator aid | Zinc oxide (Product name: Zinc Oxide No. 2, manufactured by Sakai Chemical Industry Co., Ltd.) | 5 |
| Processing aid | Zinc stearate (Product name: SZ-2000, manufactured by Sakai Chemical Industry Co., Ltd.) | 2 |

1-2. Preparation of Rubber Composition for Forming Matrix (MRC)

Respective materials of kinds and blending amounts shown in Table 3 were mixed with a 6-liter pressure kneader (product name: TD6-15MDX, manufactured by Toshin Co., Ltd.) to provide a rubber composition for forming a matrix. The mixing conditions were set to a filling ratio of 70 vol %, a blade rotation speed of 30 rpm, and 16 minutes.

TABLE 3

| | Raw material name | Blending amount (parts by mass) |
|---|---|---|
| First rubber | SBR (Product name: TUFDENE 2003, Asahi Kasei Corporation) | 100 |
| Electroconductive particles 1 | Carbon black (Product name: Thermax Floform N990, manufactured by Cancarb Limited) | 10 |
| Filler | Calcium carbonate (Product name: NANOX #30, Maruo Calcium Co., Ltd.) | 30 |
| Vulcanization accelerator aid | Zinc oxide (Product name: Zinc Oxide No. 2, manufactured by Sakai Chemical Industry Co., Ltd.) | 5 |
| Processing aid | Zinc stearate (Product name: SZ-2000, manufactured by Sakai Chemical Industry Co., Ltd.) | 2 |

1-3. Preparation of Unvulcanized Rubber Composition for Forming Electroconductive Layer Respective materials of kinds and blending amounts shown in Table 4 were mixed with an open roll to prepare a rubber composition for forming an electroconductive resin layer. An open roll having a roll diameter of 12 inches was used as a mixer. The mixing was performed under the following conditions: the mixture was bilaterally cut 20 times in total at a front roll rotation number of 10 rpm, a back roll rotation number of 8 rpm, and a roll gap of 2 mm, and was then subjected to tight milling 10 times at a roll gap of 1.0 mm.

TABLE 4

| | Raw material name | Blending amount (part(s) by mass) |
|---|---|---|
| Domain raw material | CMB for forming domains of Table 2 | 25 |
| Matrix raw material | Rubber composition for forming matrix (MRC) of Table 3 | 75 |
| Vulcanizing agent | Sulfur (Product name: SULFAX PMC, sulfur content: 97.5%, manufactured by Tsurumi Chemical Industry Co., Ltd.) | 3 |
| Vulcanization accelerator 1 | Tetrabenzylthiuram disulfide (Product name: SANCELER TBzTD, manufactured by Sanshin Chemical Industry Co., Ltd.) | 1 |
| Vulcanization accelerator 2 | N-t-Butyl-2-benzothiazolesulfenimide (Product name: SANTOCURE-TBSI, manufactured by FLEXSYS) | 0.5 |

2. Production of Electroconductive Member 2-1. Formation of Electroconductive Layer A cored bar having a total length of 252 mm and an outer diameter of 6 mm, in which the surface of free-cutting steel was subjected to electroless nickel plating, was prepared as a support. The cored bar was used as a support serving as an electroconductive mandrel. An adhesive (product name: METALOC U-20, manufactured by Toyokagaku Kenkyusho Co., Ltd.) was applied to the entire circumference within a range of 230 mm excluding 11 mm each from both end portions of the cored bar through use of a roll coater. In this Example, the cored bar having the adhesive applied thereto was used as an electroconductive support.

Next, a die having an inner diameter of 10.0 mm was attached to the tip of a crosshead extruder including a supply mechanism for the electroconductive support and a discharge mechanism for an unvulcanized rubber roller. The temperature of each of the extruder and the crosshead was adjusted to 100° C., and the conveyance speed of the electroconductive support was adjusted to 60 mm/sec. Under the conditions, the rubber composition for forming an electroconductive resin layer was supplied from the extruder, and the outer peripheral portion of the electroconductive support was covered with the rubber composition for forming an electroconductive resin layer in the crosshead. Thus, an unvulcanized rubber roller was obtained.

Next, the unvulcanized rubber roller was loaded into a hot air vulcanization furnace at 170° C., and was heated for 60 minutes so that the unvulcanized rubber composition was vulcanized. Thus, an electroconductive roller having an electroconductive resin layer formed on the outer peripheral portion of the electroconductive support was obtained. After that, both end portions of the electroconductive resin layer were cut off by 10 mm each to set the length of an electroconductive resin layer portion in a longitudinal direction to 232 mm.

2-2. Polishing of Electroconductive Layer

Next, the surface of the electroconductive layer was polished under polishing conditions described in the following polishing conditions 1. Thus, the charging roller 1 having a crown shape, in which the diameter of the center portion was 8.5 mm, and each diameter at positions of 90 mm from the center portion to both end portion sides was 8.44 mm, was obtained.

(Polishing Conditions 1)

A grinding stone of a cylindrical shape having a diameter of 305 mm and a length of 235 mm (manufactured by TEIKEN Corporation) was prepared. The kind, grain size, bond strength, bond, and structure (abrasive grain ratio) of abrasive grains are as described below.

- Material for abrasive grains: green silicon carbide (GC), (JIS R6111-2002)
- Grain size of abrasive grains: #80 (average grain diameter: 177 μm JIS B4130)
- Bond strength of abrasive grains: HH (JIS R6210)
- Bond: V4PO (vitrified)
- Structure of abrasive grains (abrasive grain ratio): 23 (content ratio of abrasive grains: 16%, JIS R6242)

The polishing conditions were as described below. The rotation speed of the grinding stone was set to 2,100 rpm, and the rotation speed of the electroconductive member was set to 250 rpm. In a rough grinding step, the grinding stone was allowed to penetrate 0.24 mm into the electroconductive member at a penetration speed of 20 mm/sec after having been brought into contact with the outer peripheral surface of the electroconductive member. In a precision polishing step, the penetration speed was changed to 0.5 mm/sec, and the grinding stone was allowed to penetrate 0.01 mm. After that, the grinding stone is separated from the electroconductive member to complete the polishing.

As a polishing method, there was adopted an upper cutting method, in which the rotation directions of the grinding stone and the electroconductive member were set to be the same direction.

3. Characteristic Evaluations 3-1. Determination of Presence or Absence of Matrix-Domain Structure The presence of the matrix-domain structure in the electroconductive layer was determined by the following method.

A cut piece (thickness: 500 μm) was cut out with a razor so that a section perpendicular to the longitudinal direction of the electroconductive layer of the electroconductive member was able to be observed. Next, platinum was deposited from the vapor on the surface of the cut piece corresponding to the section of the electroconductive layer. The platinum-deposited surface of the cut piece was photographed with a scanning electron microscope (SEM) (product name: S-4800, manufactured by Hitachi High-Technologies Corporation) at a magnification of 5,000 to obtain an SEM image. In the SEM image, when a structure in which a plurality of domains were dispersed in a matrix, and the matrices communicated to each other was recognized, the matrix-domain structure was determined to be “present”.

3-2. Measurement of Volume Resistivity of Matrix

The volume resistivity of the matrix was measured as described below with a scanning probe microscope (SPM) (product name: Q-Scope 250, manufactured by Quesant Instrument Corporation) in a contact mode. The measurement was performed under an environment having a temperature of 23° C. and a relative humidity of 50%.

First, a cut piece having a thickness of about 2 μm was cut out from the electroconductive layer of the charging roller 1 at a cutting temperature of −100° C. through use of a microtome (product name: Leica EM FCS, manufactured by Leica Microsystems). Next, the cut piece was set on a metal plate so that one surface of the cut piece corresponding to the section of the electroconductive layer was brought into contact with the surface of the metal plate. Then, a cantilever of the SPM was brought into contact with a portion of the cut piece corresponding to the matrix on the surface of the cut piece on an opposite side to the surface in contact with the surface of the metal plate. Next, a voltage of 50 V was applied to the cantilever, and a current value was measured.

In addition, the surface shape of the cut piece was observed with the SPM, and the thickness of the measurement point was calculated from the obtained height profile. Further, from the observation results of the surface shape, the area of a recess in a contact portion of the cantilever was calculated. The volume resistivity was calculated from the thickness and the area of the recess and adopted as the volume resistivity of the matrix.

3-3. Measurement of Volume Resistivity of Domain

The volume resistivity of the domain was measured in the same manner as in the method of measuring the volume resistivity of the matrix in the above-mentioned section 3-2 except that the contact position of the cantilever was set to a portion corresponding to the domain, and the voltage applied to the cantilever was set to 1 V. An average value of the values at the respective measurement portions was calculated.

3-4. Measurement of Interdomain Distance

The cut piece prepared in the measurement of the volume resistivity of the matrix in the above-mentioned section 3-2 was subjected to dyeing of only the second rubber in each of the domains with phosphotungstic acid. After that, platinum was deposited from the vapor on a surface corresponding to the section of the electroconductive layer. Next, the platinum-deposited surface was photographed with a SEM (product name: 5-4800, manufactured by Hitachi High-Technologies Corporation) at a magnification of 10,000 to obtain a SEM image.

Next, the SEM image was subjected to 8-bit gray scaling through use of an image processing analyzer (product name: LUZEX-AP, manufactured by Nireco Corporation) to obtain a monochrome image with 256 levels of gray. Next, for the binarized image, the black and white of the image were subjected to inversion processing so that the dyed domains in the monochrome image became white, and a binarization threshold was set with respect to the brightness distribution of the image based on the algorithm of Otsu's discriminant analysis method, to thereby obtain a binarized image. In the binarized image, when the thickness of the electroconductive layer was represented by T, 15-micrometer square observation regions were put at each of arbitrary three positions in a region corresponding to a thickness region from the outer surface to a depth of 0.1T to 0.9T in each of three cut pieces, i.e., nine positions in total. An interdomain distance was calculated in each of the observation regions, and the average value of the measured values of the respective interdomain distances in the observation regions at the nine positions in total was calculated.

3-5. Measurement of Ratio of First Electroconductive Particles Present as a Primary Particle With use of the SEM image acquired in the measurement of the interdomain distance in the above-mentioned section 3-4, the number N of the first electroconductive particles dispersed in the matrix and the number N(C) of particles having no interface in the particles among the first electroconductive particles were counted. The ratio of the first electroconductive particles present as a primary particle was calculated by $(N(C)/N)\times 100$.

3-6. Measurement of Average Primary Particle Diameter of First Electroconductive Particles In the SEM image analyzed in the measurement of the ratio of the first electroconductive particles present as a primary particle in the above-mentioned section 3-5, the average diameter of the particles present as a primary particle was calculated.

The observed image was subjected to 8-bit gray scaling through use of image processing software "Image-pro plus" (product name, manufactured by Media Cybernetics, Inc.) to obtain a monochrome image with 256 levels of gray. Next, the black and white of the image were subjected to inversion processing so that the domains in the monochrome image became white, and a binarization threshold was set with respect to the brightness distribution of the image based on the algorithm of Otsu's discriminant analysis method, to thereby obtain a binarized image. Next, an observation region of such a size as to accommodate one first electroconductive particle in the matrix was extracted from the obtained binarized image. Then, through use of a counting function, a sectional area S1 of the first electroconductive particle was calculated, and an average primary particle diameter d1 was calculated by $d1=(S1/2\pi)^{0.5}$.

3-7. Measurement of Average Distance Between First Electroconductive Particles and Most Proximate Domains A cut piece having a thickness of about 2 μm was cut out of the electroconductive layer of the charging roller 1 at a cutting temperature of −100° C. through use of a microtome (product name: Leica EM FCS, manufactured by Leica Microsystems) in the same manner as in the measurement of the volume resistivity of the matrix in the above-mentioned section 3-2. After that, platinum was deposited from the vapor on a surface corresponding to the section of the electroconductive layer. Next, the platinum-deposited surface was photographed with a SEM (product name: 5-4800, manufactured by Hitachi High-Technologies Corporation) at a magnification of 10,000 to obtain a SEM image.

Next, the SEM image was subjected to 8-bit gray scaling through use of an image processing analyzer (product name: LUZEX-AP, manufactured by Nireco Corporation) to obtain a monochrome image with 256 levels of gray. For the binarized image, the black and white of the image were subjected to inversion processing so that the domains and the first electroconductive particles in the monochrome image became white, and a binarization threshold was set with respect to the brightness distribution of the image based on the algorithm of Otsu's discriminant analysis method, to thereby obtain a binarized image. In the binarized image, when the thickness of the electroconductive layer was represented by T, 15-micrometer square observation regions were put at each of arbitrary three positions in a region corresponding to a thickness region from the outer surface to a depth of from 0.1T to 0.9T in each of three cut pieces, i.e., nine positions in total. In each of the observation regions, the positions of the first electroconductive particles were identified from the observed image before the binarization, and only distances between the first electroconductive particles and the domains adjacent thereto were calculated. For one first electroconductive particle, distances with a plurality of domains adjacent thereto were calculated, but of those, the shortest distance was adopted as the distance between that first electroconductive particle and the most proximate domain. The same measurement was performed for all the first electroconductive particles in the above-mentioned observation region, and then their average value was calculated. Thus, the average distance between the first electroconductive particles and the most proximate domains was calculated.

3-8. Measurement of Ratio of First Electroconductive Particles to Domains

With use of the SEM image acquired in the measurement of the volume resistivity of the matrix in the above-mentioned section 3-2, the number N(B) of the domains present in the observed image region and the number N(A) of the first electroconductive particles present therein were counted. Then, a ratio N(A)/N(B) was calculated as the ratio of the first electroconductive particles to the domains.

3-9. Measurement of Sectional Area Ratio of Second Electroconductive Particles in Domain A cut piece having a thickness of about 100 nm was cut out of the electroconductive layer of the charging roller 1 at a cutting temperature of −100° C. through use of a microtome (product name: Leica EM FCS, manufactured by Leica Microsystems), and platinum was deposited from the vapor on a surface corresponding to the section of the electroconductive layer. Next, the platinum-deposited surface was photographed with a SEM (product name: S-4800, manufactured by Hitachi High-Technologies Corporation) at a magnification of 20,000 to obtain a SEM image.

Next, binarization was performed through use of image processing software "Image-pro plus" (product name, manufactured by Media Cybernetics, Inc.) so that the carbon black in the domains was distinguishable. Next, an observation region of such a size as to accommodate one domain was extracted from the resultant binarized image. Further, through use of a counting function, a sectional area S of the domain and a sectional area Sc of the carbon black serving as the second electroconductive particles contained in the domain were calculated, and the sectional area ratio of the second electroconductive particles in the domain was calculated by Sc/S.

3-10. Measurement of Circle-Equivalent Diameter of Second Electroconductive Particles in Domain With use of the sectional area S of the domain measured in the above-mentioned section 3-9, a circle-equivalent diameter D of the domain was calculated by $D=(S/2\pi)^{0.5}$.

3-11. Measurement of Primary Particle Diameter of Second Electroconductive Particles The cut piece used for the measurement of the sectional area ratio of the second electroconductive particles in the domain in the above-mentioned section 3-9 was used and photographed with a TEM (product name: JEM-2800, manufactured by JEOL Ltd.) at a magnification of 50,000 to obtain a TEM image. An observation region was set so as to include a domain portion.

Next, binarization was performed through use of image processing software "Image-pro plus" (product name, manufactured by Media Cybernetics, Inc.) so that the carbon black serving as the second electroconductive particles in the domain was distinguishable. Then, through use of a counting function, the primary particle diameters of the second electroconductive particles were calculated, and the average value thereof was adopted as the primary particle diameter of the second electroconductive particles.

3-12. Measurement of Charge Attenuation Ratio of Surface of Charging Roller

The surface potential of the charging roller based on corona discharge was measured using a charging amount-measuring device (product name: DRA-2000L, manufactured by QEA). Specifically, the corona discharger of the charging amount-measuring device is placed so that a gap between its grid portion and the surface of the charging roller becomes 1 mm. Next, a voltage of 8 kV is applied to the corona discharger to cause discharge, thereby charging the surface of the charging roller, and surface potentials of the charging roller immediately after the completion of the discharge immediately after the charging and after a lapse of 10 seconds are measured. The surface potential immediately after the completion of the discharge (or immediately after the charging) was represented by $E_0$, the surface potential after a lapse of 10 seconds from the completion of the discharge (or after the completion of the charging) was represented by $E_{10}$, and a charge attenuation ratio Q was calculated by the following equation (5). The charge attenuation ratio Q is preferably 83% or more.

$$Q=\left(\frac{E_0-E_{10}}{E_0}\right)\times 100[\%] \tag{5}$$

3-13. Impedance Measurement

As pretreatment, platinum was deposited from the vapor on the outer surface of a charging roller while the roller was rotated to produce a measuring electrode. In this case, an electrode having a width of 1.5 cm, which was uniform in a circumferential direction, was produced through use of a masking tape. Through formation of the electrode, the contribution of the contact area between the measuring electrode and the electroconductive member can be reduced to the extent possible by the surface roughness of the charging roller.

Next, an aluminum sheet was wound around the electrode without any gap, and the electrode was connected to a measuring electrode of an impedance-measuring device (product names: Solartron 1260 and Solartron 1296, manufactured by Solartron) from the aluminum sheet.

Figure 7:
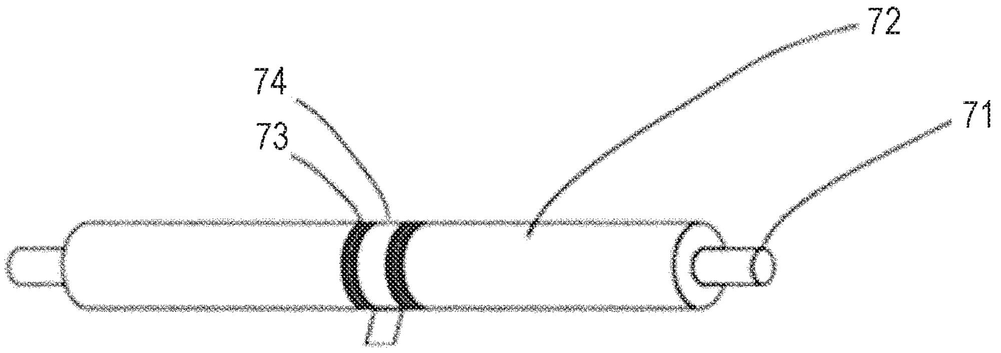
FIG. 7 is a schematic view for illustrating a state in which a measuring electrode is formed on a charging roller.

FIG. 7 is a schematic view of a state in which a measuring electrode is formed on a charging roller. In FIG. 7, there are illustrated an electroconductive support 71, an electroconductive layer 72 having a matrix-domain structure, a platinum-deposited layer 73, and an aluminum sheet 74.

Figure 8:
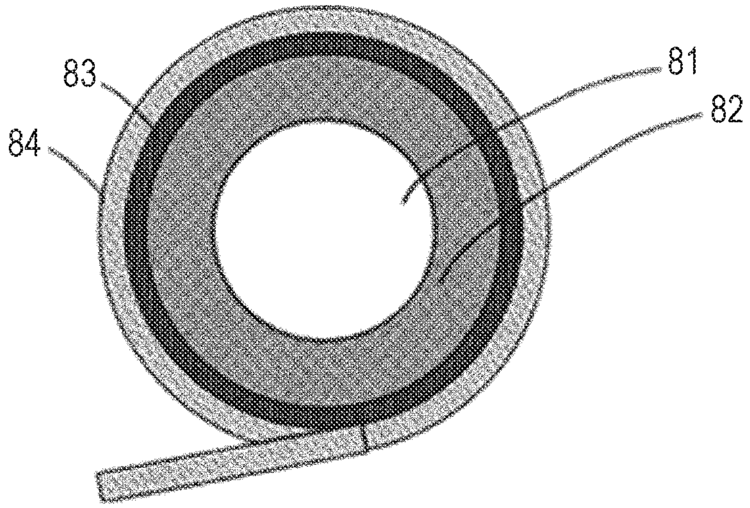
FIG. 8 is a sectional view of a state in which a measuring electrode is formed on a charging roller.

FIG. 8 is a sectional view of a state in which a measuring electrode is formed on a charging roller. There are illustrated an electroconductive support 81, an electroconductive layer 82 having a matrix-domain structure, a platinum-deposited layer 83, and an aluminum sheet 84. As illustrated in FIG. 8, it is important to establish such a state that the electroconductive layer having a matrix-domain structure is sandwiched between the electroconductive support 81 and the measuring electrode.

Then, the aluminum sheet was connected to the measuring electrode on the side of the impedance-measuring device (Solartron 1260 and Solartron 1296, manufactured by Solartron). Through use of the electroconductive support and the aluminum sheet as two electrodes for measurement, impedance measurement was performed.

The impedance measurement was performed at an AC voltage of 1 Vpp and a frequency of from $1.0\times10^{-2}$ Hz to $1.0\times10^{7}$ Hz (measured at 5 points when the frequency was changed by one order of magnitude) under an environment having a temperature of 23° C. and a relative humidity of 50% to obtain an absolute value of the impedance. Then, through use of the measurement results, a graph was created by the log-log plotting of the absolute value of the impedance and the frequency. An impedance $Z_0$ at a frequency of from $1.0\times10^{-2}$ Hz to $1.0\times10^{1}$ Hz, and the slope of impedance at from $1.0\times10^{5}$ Hz to $1.0\times10^{6}$ Hz were calculated from the graph.

Next, similar measurement was performed under a state in which a DC voltage of 10 V was applied to be superimposed on an AC voltage of 1 V, an impedance $Z_{10}$ was calculated, and a ratio $Z_0/Z_{10}$ representing the influence of the DC voltage was calculated.

4. Image Evaluation

The following evaluation was performed in order to determine the dirt resistance performance of the charging roller 1 under a high-lifetime condition.

First, a laser printer of an electrophotographic system (product name: Laser Jet Pro M203dw, manufactured by Hewlett-Packard Company) was prepared as an electrophotographic image forming apparatus. In order to perform evaluation in a high-speed process, the laser printer was reconstructed so that the number of sheets output per minute became 75 sheets/min for A4-size paper, the number being larger than the original number of output sheets. The output speed of the recording medium at that time was set to 370 mm/sec.

Next, the charging roller 1, the electrophotographic image forming apparatus, and a process cartridge were left to stand under a 15° C./30% RH environment for 48 hours for the purpose of being acclimated to an evaluation environment.

The charging roller 1 that had been left to stand under the above-mentioned environment was set as the charging roller of the process cartridge, which was incorporated into the laser printer. After that, image output was continuously performed on a total of 50,000 sheets under the same environment.

The output image was as follows: the alphabet letter "E" with a size of 4 points was formed on A4-size paper so that the print percentage was 1.0%.

After that, a halftone image (image in which horizontal lines having a width of 1 dot and an interval of 2 dots were drawn in a direction perpendicular to the rotation direction of the photosensitive drum) was output. The halftone image was visually observed, and evaluation for a white spot image was performed by the following criteria.

[Evaluation for White Spot Image on Halftone Image]

Rank A: No white spot image is found on the halftone image even by observation with a microscope.

Rank B: A white spot-like image is not found on the halftone image through visual observation, but is found by observation with a microscope.

Rank C: A white spot-like image is visually found on part of the halftone image.

Rank D: A white spot-like image is visually found over the entire surface of the halftone image.

Example 2 to Example 28

The charging rollers 2 to 28 were produced by the same method as the charging roller 1 of Example 1 except that the starting raw materials shown in Table 5 were changed. The numbers of parts by mass and physical properties of the starting raw materials used for the production of the respective electroconductive members are shown in Table 5 and Table 6. The results of the characteristic evaluations and image evaluation of the finished charging rollers 2 to 28 are shown in Table 7-1, Table 7-2, and Table 8.

Example 29

The charging roller 29 was produced in the same manner as in Example 4 except that: starting raw materials shown in Table 5 were used; the formation of the electroconductive layer was performed by a method described below; and the production did not involve any polishing process.

A cored bar having an adhesive applied thereto is used as an electroconductive support. A die having an inner diameter of 8.4 mm was attached to the tip of a crosshead extruder including a supply mechanism for the electroconductive support and a discharge mechanism for an unvulcanized rubber roller. The temperature of each of the extruder and the crosshead was set to 100° C., and extrusion was performed while the conveyance speed of the electroconductive support was changed. Molding was performed so that the unvulcanized rubber roller had an outer diameter larger than the diameter of the die. Thus, an unvulcanized rubber roller having a crown shape was obtained in which the outer diameter of the center portion was 8.5 mm, and each diameter at positions of 90 mm from the center portion to both end portion sides was 8.44 mm.

Next, the unvulcanized rubber roller was put into a hot air vulcanization furnace at 170° C. and heated for 60 minutes to vulcanize the unvulcanized rubber composition. Thus, an electroconductive roller having an electroconductive resin layer formed on the outer peripheral portion of the electroconductive support was obtained. After that, both end portions of the electroconductive resin layer were cut off by 10 mm each to set the length of an electroconductive resin layer portion in a longitudinal direction to 232 mm. Thus, the charging roller 29 was produced.

Example 30

The charging roller 30 was produced in the same manner as in Example 29 except that starting raw materials shown in Table 5 were used.

TABLE 5

| | Unvulcanized matrix rubber composition (MRC) | | | | | | | Unvulcanized domain rubber composition (CMB) | | | | | | |
|---|---|---|---|---|---|---|---|---|---|---|---|---|---|---|
| | First rubber | | | | First electroconductive particles | | | Second rubber | | | | Second electroconductive particles | | |
| | Kind | Product name | SP value | Mooney viscosity | Kind | Product name | phr | Kind | Product name | SP value | Mooney viscosity | Kind | Kind | phr |
| E-1 | SBR | T2003 | 17 | 33 | Carbon black | N990 | 10 | NBR | N230SV | 19.2 | 32 | Carbon black | #7360SB | 60 |
| E-2 | SBR | T2003 | 17 | 33 | Carbon black | N990 | 10 | NBR | N230SV | 19.2 | 32 | Carbon black | #7360SB | 60 |
| E-3 | SBR | T2003 | 17 | 33 | Carbon black | N990 | 20 | NBR | N230SV | 19.2 | 32 | Carbon black | #7360SB | 60 |
| E-4 | SBR | T2003 | 17 | 33 | Carbon black | N990 | 30 | NBR | N230SV | 19.2 | 32 | Carbon black | #7360SB | 60 |

TABLE 5-continued

| | Unvulcanized matrix rubber composition (MRC) | | | | | | | Unvulcanized domain rubber composition (CMB) | | | | | | |
|---|---|---|---|---|---|---|---|---|---|---|---|---|---|---|
| | First rubber | | | | First electroconductive particles | | | Second rubber | | | | | | |
| | | Product | SP | Mooney | | Product | | | Product | SP | Mooney | Second electroconductive particles | | |
| | Kind | name | value | viscosity | Kind | name | phr | Kind | name | value | viscosity | Kind | Kind | phr |
| E-5 | SBR | T2003 | 17 | 33 | Carbon black | N990 | 40 | NBR | N230SV | 19.2 | 32 | Carbon black | #7360SB | 60 |
| E-6 | SBR | T2003 | 17 | 33 | Carbon black | N990 | 50 | NBR | N230SV | 19.2 | 32 | Carbon black | #7360SB | 60 |
| E-7 | SBR | T2003 | 17 | 33 | Carbon black | N990 | 50 | NBR | N230SV | 19.2 | 32 | Carbon black | #7360SB | 60 |
| E-8 | SBR | T2003 | 17 | 33 | Carbon black | N990 | 30 | NBR | N230SV | 19.2 | 32 | Carbon black | #7360SB | 60 |
| E-9 | SBR | T2003 | 17 | 33 | Carbon black | N990 | 30 | NBR | N230SV | 19.2 | 32 | Carbon black | #7360SB | 60 |
| E-10 | SBR | T2003 | 17 | 33 | Carbon black | N990 | 30 | NBR | N230SV | 19.2 | 32 | Carbon black | #7360SB | 60 |
| E-11 | SBR | T2003 | 17 | 33 | Carbon black | N990 | 30 | NBR | N230SV | 19.2 | 32 | Carbon black | #7360SB | 40 |
| E-12 | SBR | T2003 | 17 | 33 | Carbon black | N990 | 30 | NBR | N230SV | 19.2 | 32 | Carbon black | #7360SB | 80 |
| E-13 | NBR | N230SV | 19.2 | 32 | Carbon black | N990 | 30 | SBR | T2003 | 17 | 33 | Carbon black | #7360SB | 60 |
| E-14 | NBR | N230SV | 19.2 | 32 | Titanium oxide | A-100 | 30 | SBR | T2003 | 17 | 33 | Carbon black | #7360SB | 60 |
| E-15 | NBR | DN401LL | 17.4 | 32 | Carbon black | N990 | 30 | SBR | T2003 | 17 | 33 | Carbon black | #7360SB | 60 |
| E-16 | NBR | DN401LL | 17.4 | 32 | Carbon black | N990 | 30 | SBR | T2003 | 17 | 33 | Carbon black | #5500 | 60 |
| E-17 | NBR | DN401LL | 17.4 | 32 | Carbon black | N990 | 30 | SBR | T2003 | 17 | 33 | Carbon black | #4500 | 60 |
| E-18 | NBR | N215SL | 21.7 | 45 | Carbon black | N990 | 30 | SBR | T2003 | 17 | 33 | Carbon black | #7360SB | 60 |
| E-19 | NBR | N215SL | 21.7 | 45 | Carbon black | N990 | 30 | SBR | T2003 | 17 | 33 | Carbon black | #5500 | 60 |
| E-20 | NBR | N215SL | 21.7 | 45 | Carbon black | N990 | 30 | SBR | T2003 | 17 | 33 | Carbon black | #4500 | 60 |
| E-21 | NBR | N230SV | 19.2 | 32 | Titanium oxide | A-100 | 30 | SBR | T2003 | 17 | 33 | Carbon black | #7360SB | 60 |
| E-22 | EPDM | E505A | 16 | 47 | Carbon black | N990 | 30 | SBR | T2003 | 17 | 33 | Carbon black | #7360SB | 60 |
| E-23 | EPDM | E505A | 16 | 47 | Titanium oxide | A-100 | 30 | SBR | T2003 | 17 | 33 | Carbon black | #7360SB | 60 |
| E-24 | EPDM | E505A | 6 | 47 | Carbon black | N990 | 30 | NBR | N230SV | 19.2 | 32 | Carbon black | #7360SB | 60 |
| E-25 | BR | BR150B | 16.8 | 40 | Carbon black | N990 | 30 | NBR | DN401LL | 17.4 | 32 | Carbon black | #7360SB | 60 |
| E-26 | IR | IR2200L | 16.5 | 70 | Carbon black | N990 | 30 | NBR | N230SV | 19.2 | 32 | Carbon black | #7360SB | 60 |
| E-27 | NBR | N230SV | 19.2 | 32 | Carbon black | N990 | 30 | SBR | T2003 | 17 | 33 | Carbon black | #7360SB | 60 |
| E-28 | SBR | T2003 | 17 | 33 | Carbon black | N990 | 30 | NBR | N230SV | 19.2 | 32 | Carbon black | #7360SB | 60 |
| E-29 | SBR | T2003 | 17 | 33 | Carbon black | N990 | 30 | NBR | N230SV | 19.2 | 32 | Carbon black | #7360SB | 60 |
| E-30 | NBR | N230SV | 19.2 | 32 | Carbon black | N990 | 30 | SBR | T2003 | 17 | 33 | Carbon black | #7360SB | 60 |

TABLE 6

| | Unvulcanized rubber composition | | | | | | | |
|---|---|---|---|---|---|---|---|---|
| | Domains (CMB) Parts by | Matrix (MRC) Parts by | Vulcanizing agent | | Vulcanization accelerator | | Other | |
| | mass | mass | Kind | phr | Kind | phr | Kind | phr |
| E-1 | 25 | 75 | Sulfur | 3 | TBzTD | 1 | — | — |
| E-2 | 40 | 60 | Sulfur | 3 | TBzTD | 1 | — | — |
| E-3 | 25 | 75 | Sulfur | 3 | TBzTD | 1 | — | — |
| E-4 | 25 | 75 | Sulfur | 3 | TBzTD | 1 | — | — |
| E-5 | 25 | 75 | Sulfur | 3 | TBzTD | 1 | — | — |

TABLE 6-continued

| | Unvulcanized rubber composition | | | | | | | |
|---|---|---|---|---|---|---|---|---|
| | Domains (CMB) Parts by | Matrix (MRC) Parts by | Vulcanizing agent | | Vulcanization accelerator | | Other | |
| | mass | mass | Kind | phr | Kind | phr | Kind | phr |
| E-6 | 25 | 75 | Sulfur | 3 | TBzTD | 1 | — | — |
| E-7 | 15 | 85 | Sulfur | 3 | TBzTD | 1 | — | — |
| E-8 | 27.5 | 72.5 | Sulfur | 3 | TBzTD | 1 | — | — |
| E-9 | 30 | 70 | Sulfur | 3 | TBzTD | 1 | — | — |
| E-10 | 35 | 65 | Sulfur | 3 | TBzTD | 1 | — | — |

TABLE 6-continued

| | Unvulcanized rubber composition | | | | | | | |
|---|---|---|---|---|---|---|---|---|
| | Domains (CMB) Parts by mass | Matrix (MRC) Parts by mass | Vulcanizing agent Kind | Vulcanizing agent phr | Vulcanization accelerator Kind | Vulcanization accelerator phr | Other Kind | Other phr |
| E-11 | 35 | 65 | Sulfur | 3 | TBzTD | 1 | — | — |
| E-12 | 35 | 65 | Sulfur | 3 | TBzTD | 1 | — | — |
| E-13 | 25 | 75 | Sulfur | 3 | TBzTD | 1 | — | — |
| E-14 | 25 | 75 | Sulfur | 3 | TBzTD | 1 | — | — |
| E-15 | 25 | 75 | Sulfur | 3 | TBzTD | 1 | — | — |
| E-16 | 25 | 75 | Sulfur | 3 | TBzTD | 1 | — | — |
| E-17 | 25 | 75 | Sulfur | 3 | TBzTD | 1 | — | — |
| E-18 | 25 | 75 | Sulfur | 3 | TBzTD | 1 | — | — |
| E-19 | 25 | 75 | Sulfur | 3 | TBzTD | 1 | — | — |
| E-20 | 25 | 75 | Sulfur | 3 | TBzTD | 1 | — | — |
| E-21 | 25 | 75 | Sulfur | 3 | TBzTD | 1 | — | — |

TABLE 6-continued

| | Unvulcanized rubber composition | | | | | | | |
|---|---|---|---|---|---|---|---|---|
| | Domains (CMB) Parts by mass | Matrix (MRC) Parts by mass | Vulcanizing agent Kind | Vulcanizing agent phr | Vulcanization accelerator Kind | Vulcanization accelerator phr | Other Kind | Other phr |
| E-22 | 25 | 75 | Sulfur | 3 | EP-60 | 4.5 | — | — |
| E-23 | 25 | 75 | Sulfur | 3 | EP-60 | 4.5 | — | — |
| E-24 | 25 | 75 | Sulfur | 3 | EP-60 | 4.5 | — | — |
| E-25 | 25 | 75 | Sulfur | 3 | TBzTD | 1 | — | — |
| E-26 | 25 | 75 | Sulfur | 3 | TBzTD | 1 | — | — |
| E-27 | 25 | 75 | Sulfur | 3 | TBzTD | 1 | XM-221U | 5 |
| E-28 | 25 | 75 | Sulfur | 3 | TBzTD | 1 | XM-221U | 5 |
| E-29 | 25 | 75 | Sulfur | 3 | TBzTD | 1 | — | — |
| E-30 | 25 | 75 | Sulfur | 3 | TBzTD | 1 | — | — |

TABLE 7-1

| | | | | Matrix | | | | | |
|---|---|---|---|---|---|---|---|---|---|
| Example | Charging roller No. | Unvulcanized rubber composition for forming electro-conductive layer | Presence or absence of matrix-domain structure | Volume resistivity Ωcm | Interdomain distance µm | Ratio of first electroconductive particles present as a primary particle vol % | Average primary particle diameter d1 of first electroconductive particles nm | Average distance between first electroconductive particles and most proximate domains µm | Number ratio of first electro-conductive particles to domains — |
| 1 | 1 | E-1 | Present | 8.30E+13 | 0.34 | 94 | 364 | 0.3 | 0.34 |
| 2 | 2 | E-2 | Present | 8.74E+13 | 0.21 | 94 | 370 | 0.19 | 0.2 |
| 3 | 3 | E-3 | Present | 7.52E+13 | 0.37 | 93 | 355 | 0.24 | 0.44 |
| 4 | 4 | E-4 | Present | 1.10E+14 | 0.29 | 95 | 340 | 0,22 | 0.52 |
| 5 | 5 | E-5 | Present | 6.98E+13 | 0.31 | 96 | 366 | 0.18 | 0.7 |
| 6 | 6 | E-6 | Present | 8.82E+13 | 0.37 | 90 | 390 | 0.15 | 1.2 |
| 7 | 7 | E-7 | Present | 1.05E+14 | 1.96 | 90 | 385 | 1.2 | 3 |
| 8 | 8 | E-8 | Present | 9.87E+13 | 0.3 | 94 | 333 | 0.2 | 0.49 |
| 9 | 9 | E-9 | Present | 1.12E+14 | 0.28 | 94 | 384 | 0.18 | 0.46 |
| 10 | 10 | E-10 | Present | 8.42E+13 | 0.22 | 95 | 342 | 0.14 | 0.43 |
| 11 | 11 | E-11 | Present | 9.91E+13 | 0.24 | 93 | 339 | 0.13 | 0.42 |
| 12 | 12 | E-12 | Present | 8.36E+13 | 0.23 | 96 | 377 | 0.12 | 0.44 |
| 13 | 13 | E-13 | Present | 3.90E+08 | 0.24 | 97 | 305 | 0.13 | 0.39 |
| 14 | 14 | E-14 | Present | 3.45E+08 | 0.27 | 91 | 206 | 0.11 | 1.11 |
| 15 | 15 | E-15 | Present | 5.08E+08 | 0.23 | 95 | 320 | 0.12 | 0.3 |
| 16 | 16 | E-16 | Present | 6.60E+08 | 0.22 | 94 | 311 | 0.11 | 0.27 |
| 17 | 17 | E-17 | Present | 5.67E+08 | 0.25 | 96 | 329 | 0.14 | 0.28 |
| 18 | 18 | E-18 | Present | 3.45E+08 | 0.54 | 96 | 357 | 0.34 | 0.87 |
| 19 | 19 | E-19 | Present | 4.40E+08 | 0.57 | 95 | 366 | 0.36 | 0.79 |
| 20 | 20 | E-20 | Present | 3.90E+08 | 0.61 | 93 | 349 | 0.35 | 0.81 |
| 21 | 21 | E-21 | Present | 3.50E+08 | 0.32 | 90 | 202 | 0.19 | 0.94 |
| 22 | 22 | E-22 | Present | 4.25E+16 | 0.58 | 94 | 386 | 0.32 | 0.41 |
| 23 | 23 | E-23 | Present | 3.06E+16 | 0.64 | 90 | 215 | 0.4 | 0.64 |
| 24 | 24 | E-24 | Present | 3.54E+16 | 0.6 | 95 | 369 | 0.38 | 0.36 |
| 25 | 25 | E-25 | Present | 4.04E+15 | 0.54 | 93 | 360 | 0.33 | 0.85 |
| 26 | 26 | E-26 | Present | 5.40E+15 | 0.7 | 92 | 384 | 0.49 | 0.92 |
| 27 | 27 | E-27 | Present | 3.80E+08 | 0.24 | 96 | 372 | 0.12 | 0.4 |
| 28 | 28 | E-28 | Present | 3.30E+08 | 0.33 | 95 | 369 | 0.18 | 0.55 |
| 29 | 29 | E-29 | Present | 1.13E+14 | 0.3 | 94 | 335 | 0.21 | 0.5 |
| 30 | 30 | E-30 | Present | 3.85E+08 | 0.23 | 96 | 309 | 0.14 | 0.41 |

TABLE 7-2

| Example | Charging roller No. | Domains: Volume resistivity Ωcm | Circle-equivalent diameter μm | Average primary particle diameter d2 of second electroconductive particles nm | Circle-equivalent diameter / d2 — | Sectional area ratio of electron electroconductive agent % |
|---|---|---|---|---|---|---|
| 1 | 1 | 2.55E+01 | 0.75 | 29 | 25.9 | 28 |
| 2 | 2 | 2.22E+01 | 1.12 | 29 | 38.6 | 28.2 |
| 3 | 3 | 2.73E+01 | 0.69 | 28 | 24.6 | 26.3 |
| 4 | 4 | 2.80E+01 | 0.73 | 29 | 25.2 | 27.4 |
| 5 | 5 | 2.15E+01 | 0.78 | 28 | 27.9 | 28.2 |
| 6 | 6 | 3.04E+01 | 0.7 | 29 | 24.1 | 27.5 |
| 7 | 7 | 2.99E+01 | 0.62 | 28 | 22.1 | 26.3 |
| 8 | 8 | 2.56E+01 | 0.83 | 28 | 29.6 | 26.5 |
| 9 | 9 | 2.70E+01 | 0.94 | 29 | 32.4 | 26.7 |
| 10 | 10 | 1.96E+01 | 1.04 | 29 | 35.9 | 28.3 |
| 11 | 11 | 3.37E+02 | 1.09 | 30 | 36.3 | 20.4 |
| 12 | 12 | 6.86E+00 | 0.94 | 28 | 33.6 | 33.2 |
| 13 | 13 | 6.06E+01 | 0.48 | 28 | 17.1 | 28.4 |
| 14 | 14 | 6.72E+01 | 0.44 | 29 | 15.2 | 28 |
| 15 | 15 | 6.32E+01 | 0.23 | 28 | 8.2 | 27.2 |
| 16 | 16 | 8.84E+00 | 0.21 | 25 | 8.4 | 29.6 |
| 17 | 17 | 1.06E+03 | 0.2 | 50 | 4.0 | 25.2 |
| 18 | 18 | 5.57E+01 | 1.26 | 28 | 45.0 | 26.3 |
| 19 | 19 | 6.94E+00 | 1.34 | 26 | 51.5 | 26.5 |
| 20 | 20 | 9.20E+02 | 1.19 | 48 | 24.8 | 26.7 |
| 21 | 21 | 5.56E+01 | 0.56 | 28 | 20.0 | 25.8 |
| 22 | 22 | 7.01E+01 | 0.35 | 29 | 12.1 | 28.4 |
| 23 | 23 | 6.87E+01 | 0.42 | 28 | 15.0 | 27.6 |
| 24 | 24 | 1.04E+01 | 0.38 | 28 | 13.6 | 27.7 |
| 25 | 25 | 4.44E+01 | 0.84 | 28 | 30.0 | 27.2 |
| 26 | 26 | 3.55E+01 | 0.94 | 29 | 32.4 | 26.9 |
| 27 | 27 | 6.06E+01 | 0.46 | 28 | 16.4 | 28 |
| 28 | 28 | 7.23E+01 | 0.7 | 29 | 24.1 | 28.6 |
| 29 | 29 | 2.90E+01 | 0.77 | 30 | 25.7 | 27 |
| 30 | 30 | 6.24E+01 | 0.5 | 29 | 17.2 | 28.8 |

TABLE 8

| Example | Unvulcanized rubber composition for forming electro-conductive layer | Charge attenuation ratio % | Impedance at $10^{-1}$ Hz: DC voltage 0 V Ω | DC voltage 10 V Ω | 0 V/10 V — | Slope of impedance at from $10^5$ Hz to $10^6$ Hz — | White spot rank in image evaluation |
|---|---|---|---|---|---|---|---|
| 1 | E-1 | 62 | 6.61E+05 | 2.36E+04 | 28 | −0.45 | C |
| 2 | E-2 | 66 | 7.73E+05 | 2.15E+04 | 36 | −0.51 | C |
| 3 | E-3 | 85 | 2.21E+04 | 8.84E+02 | 25 | −0.35 | A |
| 4 | E-4 | 92 | 4.58E+03 | 1.58E+02 | 29 | −0.25 | A |
| 5 | E-5 | 93 | 6.72E+03 | 1.77E+02 | 38 | −0.28 | A |
| 6 | E-6 | 93 | 4.50E+06 | 7.50E+04 | 60 | −0.53 | B |
| 7 | E-7 | 94 | 3.30E+06 | 7.50E+04 | 44 | −0.57 | B |
| 8 | E-8 | 90 | 5.70E+04 | 1.84E+03 | 31 | −0.38 | A |
| 9 | E-9 | 89 | 8.40E+04 | 2.55E+03 | 33 | −0.35 | A |
| 10 | E-10 | 91 | 3.70E+04 | 1.06E+03 | 35 | −0.37 | A |
| 11 | E-11 | 80 | 1.00E+08 | 2.94E+06 | 34 | −0.79 | C |
| 12 | E-12 | 93 | 2.30E+03 | 6.76E+01 | 34 | −0.21 | A |
| 13 | E-13 | 90 | 8.90E+06 | 2.34E+05 | 38 | −0.7 | B |
| 14 | E-14 | 83 | 1.20E+07 | 2.61E+05 | 46 | −0.65 | B |
| 15 | E-15 | 91 | 2.48E+06 | 6.89E+04 | 36 | −0.56 | B |
| 16 | E-16 | 90 | 3.40E+06 | 9.71E+04 | 35 | −0.57 | B |
| 17 | E-17 | 81 | 3.40E+07 | 9.19E+05 | 37 | −0.74 | C |
| 18 | E-18 | 88 | 7.40E+06 | 1.90E+05 | 39 | −0.62 | B |
| 19 | E-19 | 90 | 1.12E+06 | 2.80E+04 | 40 | −0.55 | B |
| 20 | E-20 | 80 | 7.40E+07 | 1.76E+06 | 42 | −0.79 | C |
| 21 | E-21 | 91 | 2.24E+05 | 6.79E+03 | 33 | −0.49 | A |
| 22 | E-22 | 88 | 5.40E+03 | 2.08E+02 | 26 | −0.22 | A |
| 23 | E-23 | 84 | 4.75E+03 | 1.44E+02 | 33 | −0.24 | A |
| 24 | E-24 | 90 | 4.40E+05 | 1.52E+04 | 29 | −0.45 | A |
| 25 | E-25 | 88 | 1.35E+04 | 4.22E+02 | 32 | −0.33 | A |

TABLE 8-continued

| Example | Unvulcanized rubber composition for forming electro-conductive layer | Charge attenuation ratio % | Impedance at $10^{-1}$ Hz DC voltage 0 V Ω | DC voltage 10 V Ω | 0 V/10 V — | Slope of impedance at from $10^5$ Hz to $10^6$ Hz — | White spot rank in image evaluation |
|---|---|---|---|---|---|---|---|
| 26 | E-26 | 89 | 4.10E+04 | 1.21E+03 | 34 | −0.38 | A |
| 27 | E-27 | 90 | 8.87E+06 | 2.22E+05 | 40 | −0.58 | B |
| 28 | E-28 | 93 | 7.04E+03 | 2.71E+02 | 26 | −0.29 | A |
| 29 | E-29 | 75 | 6.59E+03 | 2.13E+02 | 31 | −0.28 | B |
| 30 | E-30 | 72 | 1.12E+07 | 2.80E+05 | 40 | −0.73 | C |

COMPARATIVE EXAMPLES

Comparative Example 1

The charging roller 31 of Comparative Example 1 was produced in the same manner as in Example 1 except that, in Example 1, the materials to be used were changed to materials in the "E-31" rows of Table 9 and Table 10. The results of the characteristic evaluations and image evaluation of the finished charging roller 31 are shown in Table 11-1, Table 11-2, and Table 12.

Comparative Example 2

The charging roller 32 of Comparative Example 2 was produced in the same manner as in Example 1 except that, in Example 1, the materials to be used were changed to materials in the "E-32" rows of Table 9 and Table 10. The results of the characteristic evaluations and image evaluation of the finished charging roller 32 are shown in Table 11-1, Table 11-2, and Table 12.

Comparative Example 3

The charging roller 33 of Comparative Example 3 was produced in the same manner as in Example 1 except that, in Example 1, the materials to be used were changed to materials in the "E-33" rows of Table 9 and Table 10. The results of the characteristic evaluations and image evaluation of the finished charging roller 33 are shown in Table 11-1, Table 11-2, and Table 12.

Comparative Example 4

The charging roller 34 of Comparative Example 4 was produced in the same manner as in Example 1 except that, in Example 1, the materials to be used were changed to materials in the "E-34" rows of Table 9 and Table 10. The results of the characteristic evaluations and image evaluation of the finished charging roller 34 are shown in Table 11-1, Table 11-2, and Table 12.

TABLE 9

| | Unvulcanized matrix rubber composition (MRC) | | | | | | | Unvulcanized domain rubber composition | | | | | | |
|---|---|---|---|---|---|---|---|---|---|---|---|---|---|---|
| | First rubber | | | | First electroconductive agent | | | Second rubber | | | | Second electroconductive particles | | |
| | Kind | Product name | SP value | Mooney viscosity | Kind | Product name | phr | Kind | Product name | SP value | Mooney viscosity | Kind | Kind | phr |
| E-31 | EPDM | Esplene 301A | 17 | 44 | — | — | — | Butyl | Butyl 065 | 15.8 | 32 | Carbon black | #5500 | 60 |
| E-32 | ECO | CG103 | 18.5 | 64 | Ion electroconductive agent | LV | 3 | NBR | N230SV | 19.2 | 32 | Carbon black | Ketjen | 10 |
| E-33 | NBR | N230SV | 19.2 | 32 | Carbon black | #7360SB | 40 | SBR | T2003 | 17 | 33 | Carbon black | #7360SB | 60 |
| E-34 | — | — | — | — | — | — | — | NBR | N230SV | 19.2 | 32 | Carbon black | N990 | 120 |

TABLE 10

| | Unvulcanized rubber composition | | | | | |
|---|---|---|---|---|---|---|
| | Domains (CMB) Parts by mass | Matrix (MRC) Parts by mass | Vulcanizing agent | | Vulcanization accelerator | |
| | | | Kind | phr | Kind | phr |
| E-31 | 22 | 78 | Sulfur | 3 | TET | 3 |
| E-32 | 20 | 80 | Sulfur | 3 | TBzTD | 1 |
| E-33 | 25 | 75 | Sulfur | 3 | TBzTD | 1 |
| E-34 | 100 | 0 | Sulfur | 3 | TBzTD | 1 |

TABLE 11-1

| | | | | Matrix | | | | | |
|---|---|---|---|---|---|---|---|---|---|
| Comparative Example | Charging roller No. | Unvulcanized rubber composition for forming electro-conductive layer | Presence or absence of matrix - domain structure | Volume resistivity Ωcm | Inter-domain distance μm | Ratio of first electro-conductive particles present as single primary particles vol % | Average primary particle diameter d1 of first electro-conductive particles nm | Average distance between first electro-conductive particles and most proximate domains μm | Number ratio of first electro-conductive particles to domains — |
| 1 | 31 | E-31 | Present | 2.54E+15 | 0.22 | — | — | — | — |
| 2 | 32 | E-32 | Present | 1.44E+07 | 0.56 | — | — | — | — |
| 3 | 33 | E-33 | Present | 2.24E+06 | 0.25 | 0 | 28 | — | — |
| 4 | 34 | E-34 | Absent | — | — | — | — | — | — |

TABLE 11-2

| | | Domains | | | | |
|---|---|---|---|---|---|---|
| Comparative Example | Charging roller No. | Volume resistivity Ωcm | Circle-equivalent diameter μm | Average primary particle diameter d2 of second electroconductive particles nm | Circle-equivalent diameter / d2 — | Sectional area ratio of electron electroconductive agent % |
| 1 | 31 | 1.18E+01 | 2.55 | 25 | 102.0 | 25.9 |
| 2 | 32 | 1.25E+01 | 1.2 | 34 | 35.3 | 15.2 |
| 3 | 33 | 5.90E+01 | 0.5 | 28 | 17.9 | 27.8 |
| 4 | 34 | 8.50E+03 | — | 380 | — | 38.9 |

TABLE 12

| | | | Impedance at $10^{-1}$ Hz | | | | |
|---|---|---|---|---|---|---|---|
| Comparative Example | Unvulcanized rubber composition for forming electro-conductive layer | Charge attenuation ratio % | DC voltage 0 V Ω | DC voltage 10 V Ω | 0 V/ 10 V — | Slope of impedance at from $10^5$ Hz to $10^6$ Hz — | White spot rank in image evaluation |
| 1 | E-31 | 54 | 7.63E+04 | 2.63E+03 | 29 | −0.51 | D |
| 2 | E-32 | 88 | 5.12E+08 | 4.27E+06 | 120 | −1 | D |
| 3 | E-33 | 90 | 6.30E+05 | 5.34E+03 | 118 | −1 | D |
| 4 | E-34 | 92 | 2.30E+08 | 1.77E+06 | 130 | −1 | D |

According to the present disclosure, the electroconductive member that may be used as a charging member, a developing member, or a transfer member, the electroconductive member being capable of maintaining high image quality over a long period of time when applied to an electrophotographic image forming process increased in speed and increased in lifetime, and even in a cleaner-less configuration, is obtained. In addition, according to other aspects of the present disclosure, the electrophotographic image forming apparatus capable of stably outputting a high-quality electrophotographic image and the process cartridge to be used therefor are obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electroconductive member comprising:
a support having electro-conductivity; and
an electroconductive layer arranged on an outer surface of the support,
the electroconductive layer including:
a matrix containing:
a crosslinked product of a first rubber; and
first electroconductive particles; and
domains each containing:
a crosslinked product of a second rubber; and
second electroconductive particles,
at least a part of the first electroconductive particles being present as a primary particle in the crosslinked product of the first rubber, wherein
when defining a length of the electroconductive layer in a longitudinal direction as L and defining a thickness of the electroconductive layer as T, and when 15-micrometer square observation regions are put at arbitrary three positions in a thickness region from an outer surface of the electroconductive layer to a depth of 0.1 to 0.9T on each of cross-sections in a thickness direction of the electroconductive layer at three positions including a center of the electroconductive layer in the longitudinal direction and positions of L/4 from both ends of the electroconductive layer to the center,
an average primary particle diameter d1 of the first electroconductive particles present as a primary particle in the matrix observed in each of the nine observation regions in total is 200 nm or more, and
an average primary particle diameter d2 of the second electroconductive particles in the domains observed in each of the observation regions is 50 nm or less, and wherein
80 number % or more of the domains observed in each of the observation regions satisfy the following requirement (i) and requirement (ii)
requirement (i)
a ratio of cross-sectional areas of the second electroconductive particles included in a domain with respect to a cross-sectional area of the domain is 20% or more;
requirement (ii)
a circle-equivalent diameter of a domain is 4×d2 or more.

2. The electroconductive member according to claim 1, wherein, among the first electroconductive particles, 90 number % or more of the first electroconductive particles are present as a primary particle in the matrix.

3. The electroconductive member according to claim 1, wherein when a metal film is provided on an outer surface of the electroconductive member, and when an impedance A is measured by applying an AC voltage with an amplitude of 1V and a frequency of $1.0\times10^{-1}$ Hz between an outer surface of the support and the metal film under an environment having a temperature of 23° C. and a humidity of 50% RH, and an impedance B is measured by applying an AC voltage with an amplitude of 1V and a frequency of $1.0\times10^{-1}$ Hz and a DC voltage of 10 V between an outer surface of the support and the metal film under an environment having a temperature of 23° C. and a humidity of 50% RH, the impedance A and the impedance B satisfy the following relationship $$\text{Impedance } A/\text{impedance } B \leq 60.$$

4. The electroconductive member according to claim 1, wherein, when defining a length of the electroconductive layer in the longitudinal direction as L and defining a thickness of the electroconductive layer as T, and when 15-micrometer square observation regions are put at arbitrary three positions in a thickness region from an outer surface of the electroconductive layer to a depth of 0.1 to 0.9T on each of cross-sections in a thickness direction of the electroconductive layer at three positions including a center of the electroconductive layer in the longitudinal direction and positions of L/4 from both ends of the electroconductive layer to the center,
N(A) and N(B) satisfy the following relationship, where the N(A) represents a number of the first electroconductive particles observed in each of the nine observation regions in total and the N(B) represents a number of the domains observed therein:

$$0.2 \leq N(A)/N(B) \leq 3.0.$$

5. The electrophotographic member according to claim 4, wherein N(A) and N(B) satisfy the following relationship:

$$0.35 \leq N(A)/N(B) \leq 0.70.$$

6. The electroconductive member according to claim 1, wherein an arithmetic average value of distances between the first electroconductive particles and most proximate domains is 0.1 μm or more.

7. The electroconductive member according to claim 1, wherein an arithmetic average value of distances between the domains is 0.2 μm or more and 2.0 μm or less.

8. The electroconductive member according to claim 1, wherein the matrix has a volume resistivity of more than $1.0\times10^{8}$ Ω·cm and $1.0\times10^{17}$ Ω·cm or less.

9. The electroconductive member according to claim 1, wherein, when a surface of the electroconductive member is charged with a corona discharger by setting a distance between a grid portion of the corona discharger and the surface of the electroconductive member to 1.0 mm and applying a voltage of 8 kV to the grid portion, and when a surface potential of the surface of the electroconductive member immediately after the charging is represented by E0 and a surface potential of the surface of the electroconductive member after a lapse of 10 seconds from completion of the charging is represented by E10, a charge attenuation ratio Q represented by the following equation is 83% or more.

$$Q = \left(\frac{E_0 - E_{10}}{E_0}\right) \times 100[\%]$$

10. The electroconductive member according to claim 1, wherein the first rubber is at least one selected from the group consisting of a natural rubber (NR), an isoprene rubber (IR), a butadiene rubber (BR), a styrene-butadiene rubber (SBR), a butyl rubber (IIR), an ethylene-propylene rubber (EPM), an ethylene-propylene-diene terpolymer rubber (EPDM), a chloroprene rubber (CR), an acrylonitrile-butadiene rubber (NBR), a hydrogenated product of NBR (H-NBR), an epichlorohydrin homopolymer, an epichlorohydrin-ethylene oxide copolymer, an epichlorohydrin-ethylene oxide-allyl glycidyl ether terpolymer, and a silicone rubber.

11. The electrophotographic member according to claim 1, wherein the second rubber is at least one selected from the group consisting of a natural rubber (NR); an isoprene rubber (IR); a butadiene rubber (BR); an acrylonitrile-butadiene rubber (NBR); a styrene-butadiene rubber (SBR); a butyl rubber (IIR); an ethylene-propylene rubber (EPM); an ethylene-propylene-diene rubber (EPDM); a chloroprene rubber (CR); a nitrile rubber (NBR); a hydrogenated nitrile rubber (H-NBR); a silicone rubber; and a urethane rubber (U).

12. The electrophotographic member according to claim 11, wherein the carbon black has DBP absorption of less than 40 $cm^3$/100 g.

13. The electroconductive member according to claim 1, wherein difference of solubility parameter (SP value) between a rubber material for the domain and a rubber material for the matrix is 0.4 to 5.0 $(J/cm^3)^{0.5}$.

14. The electroconductive member according to claim 1, wherein the first rubber is SBR and the second rubber is NBR.

15. The electrophotographic member according to claim 13, wherein the electroconductive carbon black has DBP absorption of 40 to 170 $cm^3$/100 g.

16. The electroconductive member according to claim 1, wherein the first rubber is NBR and the second rubber is SBR.

17. The electrophotographic member according to claim 1, wherein the first electroconductive particles are at least one selected from the group consisting of carbon black and titanium oxide.

18. The electrophotographic member according to claim 1, wherein the second electroconductive particles are electroconductive carbon black.

19. A process cartridge removably detachable to a main body of an electrophotographic image forming apparatus, the process cartridge comprising:

an electrophotographic photosensitive member; and a charging member arranged to be able to charge the electrophotographic photosensitive member, wherein the charging member is the electroconductive member comprising:

a support having electro-conductivity; and an electroconductive layer arranged on an outer surface of the support, the electroconductive layer including:

a matrix containing:

a crosslinked product of a first rubber; and first electroconductive particles; and domains each containing:

a crosslinked product of a second rubber; and second electroconductive particles, at least a part of the first electroconductive particles being present as a primary particle in the crosslinked product of the first rubber, wherein when defining a length of the electroconductive layer in a longitudinal direction as L and defining a thickness of the electroconductive layer as T, and when 15-micrometer square observation regions are put at arbitrary three positions in a thickness region from an outer surface of the electroconductive layer to a depth of 0.1 to 0.9T on each of cross-sections in a thickness direction of the electroconductive layer at three positions including a center of the electroconductive layer in the longitudinal direction and positions of L/4 from both ends of the electroconductive layer to the center, an average primary particle diameter d1 of the first electroconductive particles present as a primary particle in the matrix observed in each of the nine observation regions in total is 200 nm or more, and an average primary particle diameter d2 of the second electroconductive particles in the domains observed in each of the observation regions is 50 nm or less, and wherein 80 number % or more of the domains observed in each of the observation regions satisfy the following requirement (i) and requirement (ii)

requirement (i)

a ratio of cross-sectional areas of the second electroconductive particles included in a domain with respect to a cross-sectional area of the domain is 20% or more;

requirement (ii)

a circle-equivalent diameter of a domain is 4×d2 or more.

20. An electrophotographic image forming apparatus comprising:

an electrophotographic photosensitive member; and a charging roller arranged to be able to charge the electrophotographic photosensitive member, wherein the charging roller is the electroconductive member comprising:

a support having electro-conductivity; and an electroconductive layer arranged on an outer surface of the support, the electroconductive layer including:

a matrix containing:

a crosslinked product of a first rubber; and first electroconductive particles; and domains each containing:

a crosslinked product of a second rubber; and second electroconductive particles, at least a part of the first electroconductive particles being present as a primary particle in the crosslinked product of the first rubber, wherein when defining a length of the electroconductive layer in a longitudinal direction as L and defining a thickness of the electroconductive layer as T, and when 15-micrometer square observation regions are put at arbitrary three positions in a thickness region from an outer surface of the electroconductive layer to a depth of 0.1 to 0.9T on each of cross-sections in a thickness direction of the electroconductive layer at three positions including a center of the electroconductive layer in the longitudinal direction and positions of L/4 from both ends of the electroconductive layer to the center, an average primary particle diameter d1 of the first electroconductive particles present as a primary particle in the matrix observed in each of the nine observation regions in total is 200 nm or more, and an average primary particle diameter d2 of the second electroconductive particles in the domains observed in each of the observation regions is 50 nm or less, and wherein 80 number % or more of the domains observed in each of the observation regions satisfy the following requirement (i) and requirement (ii)

requirement (i)

a ratio of cross-sectional areas of the second electroconductive particles included in a domain with respect to a cross-sectional area of the domain is 20% or more;

requirement (ii)

a circle-equivalent diameter of a domain is 4×d2 or more.

* * * * *